US008296769B2

(12) United States Patent
Matsuzaki et al.

(10) Patent No.: US 8,296,769 B2
(45) Date of Patent: Oct. 23, 2012

(54) ORDER-RELATION ANALYZING APPARATUS, METHOD, AND COMPUTER PROGRAM PRODUCT THEREOF

(75) Inventors: Hidenori Matsuzaki, Kanagawa (JP); Tatsuya Mori, Tokyo (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1035 days.

(21) Appl. No.: 12/050,685

(22) Filed: Mar. 18, 2008

(65) Prior Publication Data

US 2009/0019451 A1 Jan. 15, 2009

(30) Foreign Application Priority Data

Jul. 13, 2007 (JP) ................................. 2007-184767

(51) Int. Cl.
*G06F 9/46* (2006.01)
(52) U.S. Cl. ........................................................ 718/102
(58) Field of Classification Search ........................ None
See application file for complete search history.

(56) References Cited

U.S. PATENT DOCUMENTS 5,630,166 A * 5/1997 Gamache et al. ............... 712/29
6,593,940 B1 7/2003 Petersen et al.
2005/0038806 A1 * 2/2005 Ma .................................. 707/102
2005/0283673 A1 * 12/2005 Ode ................................. 714/31

OTHER PUBLICATIONS

Utpal Banerjee, et al, "A Theory of Data Race Detection", PADTAD-IV, Intel, 2006, pp. 69-78.
Anders Gidenstam, et al., "Adaptive Plausible Clocks", Technical Report No. 2003-07, Goterborg University, 2003, 22 Pages.

* cited by examiner

*Primary Examiner* — Eddie P Chan
*Assistant Examiner* — John Lindlof
(74) *Attorney, Agent, or Firm* — Oblon, Spivak, McClelland, Maier & Neustadt, L.L.P.

(57) ABSTRACT

An order-relation analyzing apparatus collects assigned destination processor information, a synchronization process order and synchronization information, determines a corresponding element associated with a program among a plurality of elements indicating an ordinal value of the program based on the assigned destination processor information, when an execution of the program is started, and calculates the ordinal value indicated by the corresponding element for each segment based on the synchronization information, when the synchronization process occurs while executing the program. When a first corresponding element associated with a second program, of which the execution starts after the execution of a first program associated with the first corresponding element finishes, is determined, the ordinal value of the second program is calculated by calculating the ordinal value indicated by the first corresponding element.

11 Claims, 20 Drawing Sheets

FIG.6

| TID | PID | EVENT_TYPE | EVENT_NAME | SYNC_SRC | SYNC_DST | MEM_ADDR |
|---|---|---|---|---|---|---|
| T1 | 1 | SYNC | START | - | - | - |
| T2 | 3 | SYNC | START | - | - | - |
| T2 |   | SYNC | CREATE | - | T3 | - |
| T2 |   | MEM | WRITE | - | - | 0×1000 |
| T3 | 2 | SYNC | START | T3 | - | - |
| T2 |   | SYNC | FINISH |   |   |   |
| T1 |   | SYNC | SIGNAL | - | SIG1 | - |
| T1 |   | SYNC | FINISH |   |   |   |
| T3 |   | SYNC | AWAKE | SIG1 | - | - |
| T3 |   | MEM | READ | - | - | 0×1000 |
| T3 |   | SYNC | CREATE | - | T4 | - |
| T4 | 3 | SYNC | START | T4 | - | - |
| T3 |   | SYNC | CREATE | - | T5 | - |
| T5 | 1 | SYNC | START | T5 | - | - |
| T3 |   | SYNC | FINISH |   |   |   |
| T4 |   | SYNC | SIGNAL | - | SIG2 | - |
| T4 |   | MEM | WRITE | - | - | 0×1000 |

FIG.7

| vec_ID |  |  |  |  |
|---|---|---|---|---|
| vec_value |  |  |  |  |

| ADDR | LAST WRITE | | LAST READ | |
|---|---|---|---|---|
| | vec_ID | elem_value | vec_ID | elem_value |
| | | | | |
| | | | | |
| | | | | |
| | | | | |

| TID | | | | |
|---|---|---|---|---|
| vec_ID | | | | |

| sync_ID | | | | |
|---|---|---|---|---|
| src_vec_value | | | | |

FIG.18

| EVENT | vec_ID | 1 | 2 | 3 |
|---|---|---|---|---|
| INIT | | (0, 0, 0) | (0, 0, 0) | (0, 0, 0) |
| START T1@P1 | | (0, 0, 0) | | |
| START T2@P3 | | | | (0, 0, 0) |
| CREATE T2→T3 | | | | (0, 0, 1) |
| WR 0×1000@T2 | | | | |
| START T3@P2 | | | (0, 0, 1) | |
| FINISH T2 | TRANSITION OF vec_value | | | |
| SIGNAL T1→T3 | | (1, 0, 0) | | |
| FINISH T1 | | | | |
| AWAKE T1→T3 | | | (1, 0, 1) | |
| RD 0×1000@T3 | | | | |
| CREATE T3→T4 | | | (1, 1, 1) | |
| START T4@P3 | | | | (1, 1, 1) |
| CREATE T3→T5 | | | (1, 2, 1) | |
| START T5@P1 | | (1, 2, 1) | | |
| FINISH T3 | | | | |
| SIGNAL T4→T6 | | | | (1, 1, 2) |
| WR 0×1000@T4 | | | | |

FIG.19

| EVENT | TID | T1 | T2 | T3 | T4 | T5 |
|---|---|---|---|---|---|---|
| START T1@P1 | vec_ID | 1 | | | | |
| START T2@P3 | | | 3 | | | |
| CREATE T2→T3 | | | | | | |
| WR 0×1000@T2 | | | | | | |
| START T3@P2 | | | | 2 | | |
| FINISH T2 | | | | | | |
| SIGNAL T1→T3 | | | | | | |
| FINISH T1 | | | | | | |
| AWAKE T1→T3 | | | | | | |
| RD 0×1000@T3 | | | | | | |
| CREATE T3→T4 | | | | | | |
| START T4@P3 | | | | | 3 | |
| CREATE T3→T5 | | | | | | |
| START T5@P1 | | | | | | 1 |
| FINISH T3 | | | | | | |
| SIGNAL T4→T6 | | | | | | |
| WR 0×1000@T4 | | | | | | |

FIG.20

| EVENT | LAST WRITE | | LAST READ | | CHECK RESULT |
|---|---|---|---|---|---|
| | vec_ID | elem_value | vec_ID | elem_value | |
| START T1@P1 | | | | | |
| START T2@P3 | | | | | |
| CREATE T2→T3 | | | | | |
| WR 0×1000@T2 | 3 | 1 | | | OK |
| START T3@P2 | | | | | |
| FINISH T2 | | | | | |
| SIGNAL T1→T3 | | | | | |
| FINISH T1 | | | | | |
| AWAKE T1→T3 | | | | | |
| RD 0×1000@T3 | | | 2 | 0 | RACE WITH WR |
| CREATE T3→T4 | | | | | |
| START T4@P3 | | | | | |
| CREATE T3→T5 | | | | | |
| START T5@P1 | | | | | |
| FINISH T3 | | | | | |
| SIGNAL T4→T6 | | | | | |
| WR 0×1000@T4 | 3 | 2 | | | OK |

FIG.22

| EVENT | vec_ID | 1 | 2 | 3 | 4 | 5 | 6 |
|---|---|---|---|---|---|---|---|
| INIT | | (0,0,0,0,0,0) | (0,0,0,0,0,0) | (0,0,0,0,0,0) | (0,0,0,0,0,0) | (0,0,0,0,0,0) | (0,0,0,0,0,0) |
| START T1@P1 | | (0,0,0,0,0,0) | | | | | |
| START T2@P3 | TRANSITION OF vec_value | | | | | (0,0,0,0,0,0) | |
| CREATE T2→T3 | | | | | | (0,0,0,0,1,0) | |
| WR 0x1000@T2 | | | | (0,0,0,0,1,0) | | | |
| START T3@P2 | | | | | | | |
| FINISH T2 | | | | | | | |
| SIGNAL T1→T3 | | (1,0,0,0,0,0) | | | | | |
| FINISH T1 | | | | | | | |
| AWAKE T1→T3 | | | | (1,0,0,0,1,0) | | | |
| RD 0x1000@T3 | | | | | | | |
| CREATE T3→T4 | | | | (1,0,1,0,1,0) | | | |
| START T4@P3 | | | (1,0,2,0,1,0) | | | | |
| CREATE T3→T5 | | | | (1,0,2,0,1,0) | | | |
| START T5@P1 | | | (1,0,2,0,1,0) | | | | (1,0,1,0,1,0) |
| FINISH T3 | | | | | | | |
| SIGNAL T4→T6 | | | | | | | (1,0,1,0,1,1) |
| WR 0x1000@T4 | | | | | | | |

FIG.23

| EVENT | TID | T1 | T2 | T3 | T4 | T5 |
|---|---|---|---|---|---|---|
| START T1@P1 | | 1 | | | | |
| START T2@P3 | | | 5 | | | |
| CREATE T2→T3 | | | | | | |
| WR 0×1000@T2 | | | | | | |
| START T3@P2 | | | | 3 | | |
| FINISH T2 | | | | | | |
| SIGNAL T1→T3 | | | | | | |
| FINISH T1 | vec_ID | | | | | |
| AWAKE T1→T3 | | | | | | |
| RD 0×1000@T3 | | | | | | |
| CREATE T3→T4 | | | | | | |
| START T4@P3 | | | | | 6 | |
| CREATE T3→T5 | | | | | | |
| START T5@P1 | | | | | | 2 |
| FINISH T3 | | | | | | |
| SIGNAL T4→T6 | | | | | | |
| WR 0×1000@T4 | | | | | | |

FIG.24

| EVENT | LAST WRITE | | LAST READ | | CHECK RESULT |
|---|---|---|---|---|---|
| | vec_ID | elem_value | vec_ID | elem_value | |
| START T1@P1 | | | | | |
| START T2@P3 | | | | | |
| CREATE T2→T3 | | | | | |
| WR 0×1000@T2 | 5 | 1 | | | OK |
| START T3@P2 | | | | | |
| FINISH T2 | | | | | |
| SIGNAL T1→T3 | | | | | |
| FINISH T1 | | | | | |
| AWAKE T1→T3 | | | | | |
| RD 0×1000@T3 | | | 3 | 0 | RACE WITH WR |
| CREATE T3→T4 | | | | | |
| START T4@P3 | | | | | |
| CREATE T3→T5 | | | | | |
| START T5@P1 | | | | | |
| FINISH T3 | | | | | |
| SIGNAL T4→T6 | | | | | |
| WR 0×1000@T4 | 6 | 1 | | | RACE WITH WR |

FIG.25

| EVENT | vec_ID | 1 | 2 | 3 |
|---|---|---|---|---|
| INIT | | (0, 0, 0) | (0, 0, 0) | (0, 0, 0) |
| START T1@P1 | | (0, 0, 0), T1 | | |
| START T2@P3 | | | | (0, 0, 0), T2 |
| CREATE T2→T3 | | | | (0, 0, 1), T2 |
| WR 0×1000@T2 | | | | |
| START T3@P2 | | | (0, 0, 1), T3 | |
| FINISH T2 | | | | |
| SIGNAL T1→T3 | TRANSITION OF vec_value | (1, 0, 0), T1 | | |
| FINISH T1 | | | | |
| AWAKE T1→T3 | | | (1, 0, 1), T3 | |
| RD 0×1000@T3 | | | | |
| CREATE T3→T4 | | | (1, 1, 1), T3 | |
| START T4@P3 | | | | (1, 1, 1), T4 |
| CREATE T3→T5 | | | (1, 2, 1), T3 | |
| START T5@P1 | | (1, 2, 1), T5 | | |
| FINISH T3 | | | | |
| WR 0×1000@T4 | | | | |
| SIGNAL T4→T6 | | | | (1, 1, 2), T4 |

FIG.26

| EVENT | LAST WRITE ||| LAST READ ||| CHECK RESULT |
|---|---|---|---|---|---|---|---|
| | TID | vec_ID | elem_value | TID | vec_ID | elem_value | |
| START T1@P1 | | | | | | | |
| START T2@P3 | | | | | | | |
| CREATE T2→T3 | | | | | | | |
| WR 0×1000@T2 | T2 | 3 | 1 | | | | OK |
| START T3@P2 | | | | | | | |
| FINISH T2 | | | | | | | |
| SIGNAL T1→T3 | | | | | | | |
| FINISH T1 | | | | | | | |
| AWAKE T1→T3 | | | | | | | |
| RD 0×1000@T3 | | | | T3 | 2 | 0 | RACE WITH WR |
| CREATE T3→T4 | | | | | | | |
| START T4@P3 | | | | | | | |
| CREATE T3→T5 | | | | | | | |
| START T5@P1 | | | | | | | |
| FINISH T3 | | | | | | | |
| WR 0×1000@T4 | T4 | 3 | 1 | | | | RACE WITH WR |
| SIGNAL T4→T6 | | | | | | | |

ORDER-RELATION ANALYZING APPARATUS, METHOD, AND COMPUTER PROGRAM PRODUCT THEREOF

CROSS-REFERENCE TO RELATED APPLICATIONS

This application is based upon and claims the benefit of priority from the prior Japanese Patent Application No. 2007-184767, filed on Jul. 13, 2007; the entire contents of which are incorporated herein by reference.

BACKGROUND OF THE INVENTION

1. Field of the Invention

The present invention relates to an order-relation analyzing apparatus that analyzes order relations among programs executed in parallel, a method, and a computer program product thereof.

2. Description of the Related Art

As a parallel programming environment in a multiprocessor that includes a shared memory, for example, a multi-thread system represented by a POSIX thread is known. In the program described by the multi-thread system, correct descriptions of synchronization relations among a plurality of threads are important. When the synchronization relations among the threads are not described correctly, for example, the following problem is known to occur. The problem is called data races, in which a plurality of threads simultaneously update the same memory region.

To detect the data races, a method of storing partial order relations of sections in a thread is developed, which are executed by using a Logical Vector Clock (vector) and detecting whether the order relations exist among the sections in the threads that have accessed the same address in a memory (For example, refer to U.S. Pat. No. 6,593,940, "Method for finding errors in multithreaded applications", 2003, hereinafter, "Document 1" and "A Theory of Data Race Detection", PAD-TAD-IV 2006, Intel, hereinafter, "Document 2"). The Logical Vector Clock defines logical time with each thread. In the method, an execution state is collected as trace information with each thread being executed, and the Logical Vector Clock, which shows order relations among the threads being executed, is calculated based on the information included in the trace information. In general, in an order relation analysis using the Logical Vector Clock, time viewed from the different threads is stored in each element of the Logical Vector Clock. Accordingly, the Logical Vector Clock that has the same number of elements as the threads to be analyzed needs to be used. Therefore, in conventional technologies such as the Document 1 and Document 2, data size (size of the Logical Vector Clock) for analysis increases in proportion to the number of threads being executed. In a parallel process that is realized in a number of threads, resources required for analysis itself will increase.

In recent years, a method of fixing the number of elements of the Logical Vector Clock to less than the number of threads, so that a plurality of threads can analyze by reusing the number of elements limited to less than the number of threads, while preventing information required for analysis from being omitted as much as possible, is also developed (for example, refer to A. Gidenstam, "Adaptive Plausible Clocks", Technical Report no. 2003-7, Goterborg University, 2003, hereinafter, "Document 3").

A technology called NUREV, which is disclosed in the Document 3, intends to share elements among processes that can be simultaneously executed in parallel. In the technology, a process of determining an element to indicate the time of thread is required, whenever a synchronization process occurs, thereby creating a process burden to the determination of element itself. Further, a mapping of elements, which are assigned to each synchronization process, is changed dynamically, thereby increasing the memory capacity for storing the information related to the mapping. A technology called REV, which is also disclosed in the Document 2, determines the elements to be assigned by using a surplus value, which a thread ID is divided by a size of the Logical Vector Clock. Accordingly, such a problem of sharing the same elements in the simultaneously executed threads may occur.

SUMMARY OF THE INVENTION

According to one aspect of the present invention, an order-relation analyzing apparatus analyzes an order relation among a plurality of programs executed in parallel by a plurality of processors, respectively. The apparatus includes a collecting unit that collects assigned destination processor information specifying a processor assigned with an execution of the program, and synchronization information specifying an order of a synchronization process and the program, generated while executing the program; a storing unit that stores a data format including a plurality of elements indicating an ordinal value of the program; a determining unit that determines a corresponding element associated with the program among the elements included in the data format, based on the assigned destination processor information, when the execution of the program is started; and a calculating unit that calculates the ordinal value indicated by the corresponding element determined as the element associated with the program, for each segment that the program is divided into greater or equal to one, based on the synchronization information, when the synchronization process occurs while executing the programs, wherein the calculating unit calculates the ordinal value of a second program by calculating the ordinal value indicated by a first corresponding element so that a first segment of the second program is a segment that succeeds a last segment of a first program, when the first corresponding element is determined as the element associated with the second program that the execution is started, after the first program associated with the first corresponding element among the elements is finished.

According to another aspect of the present invention, an order-relation analyzing apparatus analyzes an order relation among a plurality of programs executed in parallel by a plurality of processors, respectively. The order-relation analyzing apparatus includes a collecting unit that collects assigned destination processor information specifying the processors assigned with an execution of the program, synchronization information specifying an order of a synchronization process and the program generated while executing the program, and memory access information specifying a type of a memory access, an order of the memory access, a memory address of the memory access, and the program generated while executing the program; a determining unit that determines a corresponding element associated with the program among a plurality of elements including a data format having the elements that indicate an ordinal value of the programs, based on the assigned destination processor information, when the execution of the program is started; a calculating unit that calculates the ordinal value indicated by the corresponding element determined as the element associated with the program, for each segment that the program is divided into equal to or more than one, based on the synchronization information, when the synchronization process occurs while executing the program;

and a first detecting unit that analyzes the ordinal value among the programs generating the memory access to the same memory address, based on the memory access information, and detects as an exclusive control error, when the order relation among the programs is not established; wherein the calculating unit calculates the ordinal value of the second program by calculating the ordinal value indicated by a first corresponding element, so that a first segment of the second program is a segment that succeeds a last segment of the first program, when the first corresponding element is determined as the element associated with a second program that the execution is started after the execution of a first program associated with the first corresponding element among the elements is finished; and the first detecting unit includes: an updating unit that specifies the ordinal value indicated by the corresponding element associated with the program and calculated with respect to the segment including the memory access, by using the order of the memory access and the program specified by the memory access information, and updates address state information storing the type of the memory access and an access state of each memory address; and a second detecting unit that analyzes whether the order relation establishes between the segment including a first memory access and the segment including the memory access being generated, by using the address state information updated with respect to the first memory access generated to the same memory address before generating the memory access, and the ordinal value calculated with respect to the segment including the memory access being generated, when the memory access is generated while executing the program.

According to still another aspect of the present invention, an order-relation analyzing method analyzes an order relation among a plurality of programs executed in parallel by a plurality of processors, respectively, executed in an order-relation analyzing apparatus including a collecting unit, a determining unit, and a calculating unit. The order-relation analyzing method includes collecting, by the collecting unit, assigned destination processor information specifying a processor assigned with an execution of the program, and synchronization information specifying an order of a synchronization process and the program, generated while executing the program; determining, by the determining unit, a corresponding element associated with the program among the elements included in a data format including a plurality of elements indicating an ordinal value of the program, based on the assigned destination processor information, when the execution of the program is started; and calculating, by the calculating unit, the ordinal value indicated by the corresponding element determined as the element associated with the program, for each segment that the program is divided into more than one, based on the synchronization information, when the synchronization process occurs while executing the program, wherein in the calculating, the ordinal value of a second program is calculated by calculating the ordinal value indicated by a first corresponding element so that a first segment of the second program is a segment that succeeds a last segment of a first program, when the first corresponding element is determined as the element associated with the second program that the execution is started, after the first program associated with the first corresponding element among the elements is finished.

A computer program product according to still another aspect of the present invention causes a computer to perform the method according to the present invention.

BRIEF DESCRIPTION OF THE DRAWINGS

FIG. 6 is an explanatory table of a data configuration of trace information;

FIG. 7 is an explanatory table of a data configuration of order relation information;

FIG. 18 is a table of an update state of an order relation information table 22;

FIG. 19 is a table of an update state of a TID-vec_ID correspondence table 21;

FIG. 20 is a table of an update state of an address state information table 23;

FIG. 22 is a table of an update state of the order relation information table 22;

FIG. 23 is a table of an update state of the TID-vec_ID correspondence table 21;

FIG. 24 is a table of an update state of the address state information table 23;

FIG. 25 is an explanatory table of a data configuration of order relation information according to the modification of the present embodiment;

FIG. 26 is an explanatory table of an alternative data configuration of the address state information;

DETAILED DESCRIPTION OF THE INVENTION

Figure 1:
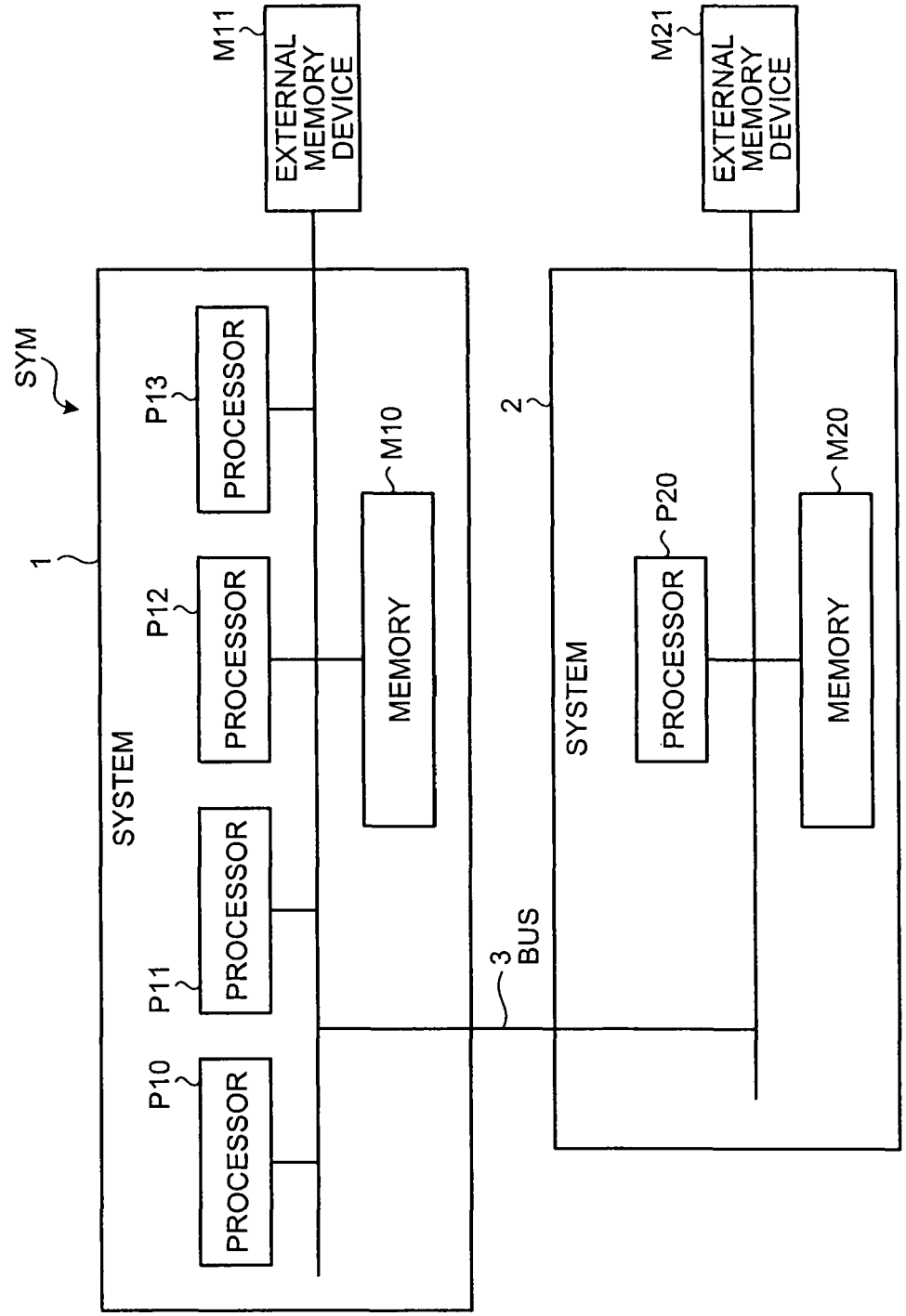
FIG. 1 is a block diagram of an overall configuration of an analysis system SYM according to an embodiment of the present invention.

FIG. 1 is a block diagram of an overall configuration of an analysis system SYM. The analysis system SYM according to an embodiment of the present invention includes a system 1 and a system 2, which are connected each other by a bus 3. The system 1 includes processors P10 through P13, and a memory M10 that is shared by the processors P10 through P13. An external memory device M11 is connected to the system 1. Various programs such as a multi-thread program that detects the data races, and a control program such as a schedule management program that controls executions of respective threads, are stored in the memory M10. By executing the schedule management program stored in the memory M10, the processor P10 manages executions of the respective threads included in the multi-thread program. The processor P10 is hereinafter referred to as "scheduler". The scheduler, more particularly, assigns any of the processors P11 through P13 to the respective threads, which are included in the multi-thread program. The scheduler also assigns a vector and controls the start and an execution state of the respective threads of the processors P11 through P13. The processors P11 through P13 respectively execute a plurality of threads included in the multi-thread program, which is stored in the memory M10, under a control of the processor P10. Here, the threads correspond to a plurality of programs that analyze order relations. Various programs and various data are stored in the external memory device M11.

The system 2 includes a processor P20 and a memory M20. An external memory device M21 is connected to the system 2. An order relation analysis program to analyze order relations among threads and a data race detection program to detect data races are stored in the memory M20. Trace information to analyze the order relations among threads is also stored in the memory M20. The trace information is transferred from the system 1 to the system 2 via the bus 3. Details of the trace information will be explained later. Various programs and various data are stored in the external memory device M21.

Figure 2:
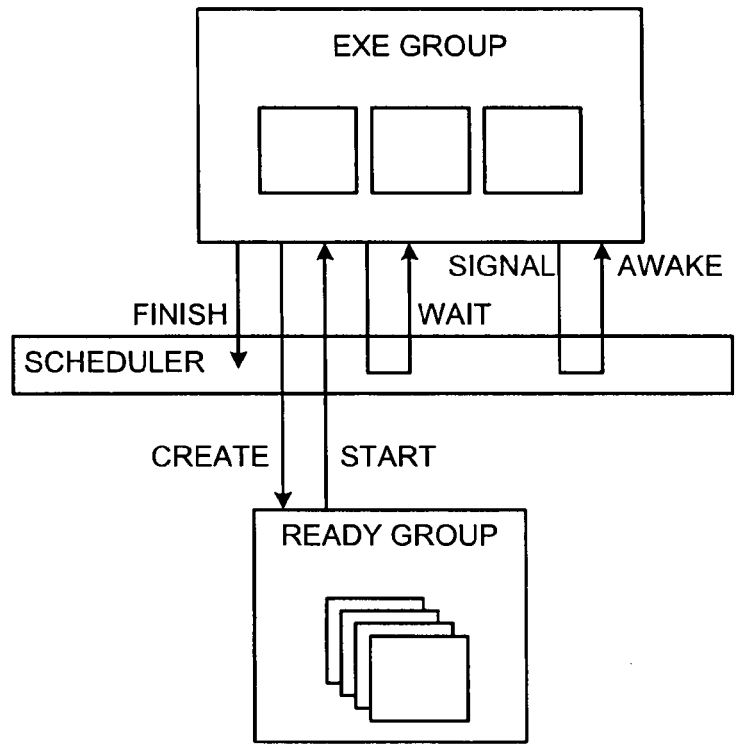
FIG. 2 is a conceptual diagram of an operation performed by a multi-thread program.

An operation performed by the multi-thread program executed in the system 1 will now be explained. FIG. 2 is a conceptual diagram of an operation performed by a multi-thread program. The execution of the respective threads according to the multi-thread program is managed by the scheduler. The scheduler manages the thread created (create) in the multi-thread program as a "Ready Group". When a processor that can execute the thread (hereinafter, "execution processor") is found among the processors P11 through P13, one of the threads in the "Ready Group" is selected, and the execution is assigned to the execution processor (start). The scheduler manages the thread, which is assigned to be executed, as an "Exe Group". The execution processor, to which the thread is assigned, executes the thread. The execution processor also executes events such as a creation of a new thread (create), a wait for a synchronous notification from the other threads (wait), a cancellation of a synchronous wait of the other threads (signal), and a notification of finishing threads (finish) via the scheduler.

In the present embodiment, while the execution processor is executing threads, data may be exchanged with the other execution processor, which is executing the other threads, via the memory M10. In such a configuration, when synchronization relations between a set of "Wait" and "Signal", or a set of "Create" and "Start" are not specified correctly, data races may occur. The data races may be the one that the threads, which are executed in parallel, simultaneously perform an update process to the same memory address. The analysis system SYM according to the present embodiment detects such data races.

Figure 3:
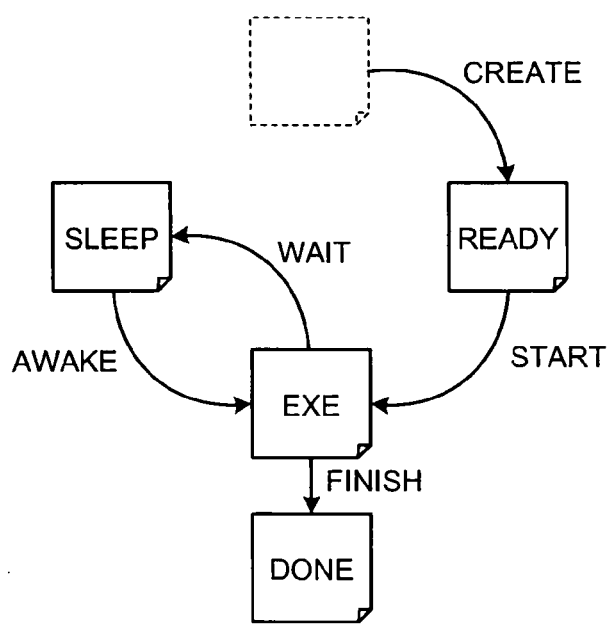
FIG. 3 is a conceptual diagram of a state transition of a thread.

A state transition of a thread executed as above will now be explained. FIG. 3 is a conceptual diagram of a state transition of a thread. When created (create), the thread becomes "ready" state and added to the "Ready Group" in FIG. 2 by the scheduler. When the execution is assigned (start), the thread becomes "exe" state, and will be executed by the execution processor being assigned. The "exe" state thread then transits to "sleep" state, by performing the "wait" process by itself. The thread becomes "exe" state again, when an "awake" process is performed by the scheduler that is notified of a cancellation of a synchronous wait from the other thread (signal). When the process is finished during "exe" state, a "finish" process is performed, and transits to "done" state.

While the execution model of the multi-thread program uses known technology, the present embodiment features the scheduler preventing the thread in "exe" state from transiting to "ready" state. In other words, when once started an execution, the thread continues to be assigned to the assigned execution processor, until the process is finished. The other parts may be replaced by any other alternative technologies.

Figure 4:
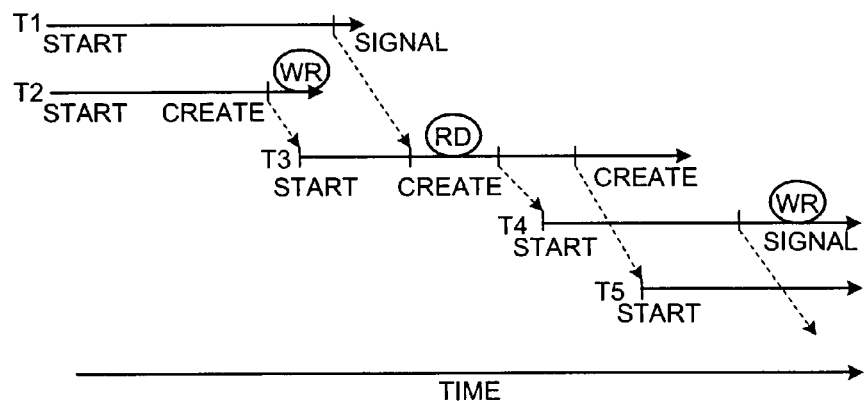
FIG. 4 is a schematic diagram of how five threads are executed in parallel.

An example of executing a plurality of threads in parallel will now be explained. FIG. 4 is a schematic diagram of how five threads are executed in parallel. The five threads are respectively denoted with thread IDs (TIDs) "T1", "T2", "T3", "T4", and "T5" that correspond to thread identification information to identify the threads. Theoretically, an integer value may be used for the TID. However, to clarify that it is the thread ID, "T" is provided in front of the ordinal numbers, such as "T1" and "T2". The IDs (TIDs) of the respective threads are denoted, for example, by the scheduler.

Broken arrows between the threads indicate the synchronization processes, the types of which are indicated by "Create" or "Signal". "WR" and "RD" indicate that a memory access is generated to a certain address "0x1000", and respectively indicate a writing process and a reading process to and from the address. The respective threads T1 through T5 are divided into segments, with every occurrence of "Create", "Signal", "Awake", and "Finish", after "Start". For example, in the thread T3, one segment is from the "Start" to the first "Create", and another segment is from the first "Create" to the second "Create".

Figure 5:
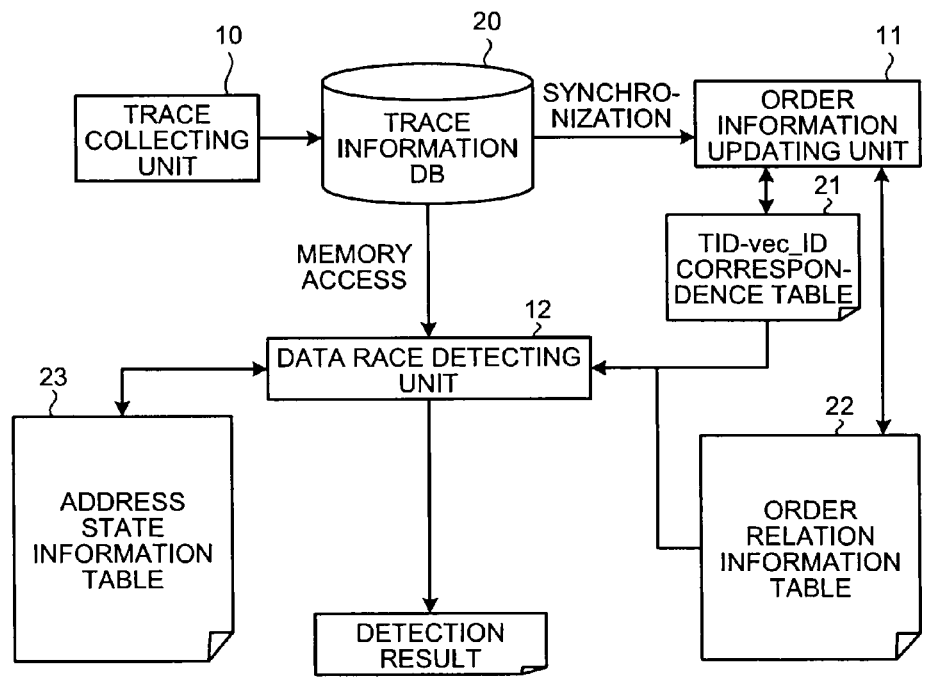
FIG. 5 is a block diagram of a functional configuration of the analysis system SYM.

A functional configuration of the analysis system SYM will now be explained. FIG. 5 is a diagram of a functional configuration of the analysis system SYM. A function of the analysis system SYM includes a trace collecting unit 10, an order information updating unit 11, a data race detecting unit 12, a trace information DB 20, an order relation information table 22, an address state information table 23, and a TID-vec_ID correspondence table 21.

The trace collecting unit 10 is a function realized by executing a predetermined program in the system 1. The trace collecting unit 10 collects information related to the synchronization process and information related to the memory access, which are generated while the multi-thread program is being executed in the system 1, as trace information. The trace collecting unit 10 then sequentially stores the information in the trace information DB 20. A configuration of the trace collecting unit, for example, may be realized by known technologies such as the one disclosed in the Document 1. The present embodiment features the trace information to be collected. However, the collection method is not particularly limited. A detailed configuration of the trace information will be explained later.

The order information updating unit 11 is a function realized by executing an order information update program in the system 2. The order information updating unit 11 determines elements of a vector associated with thread, and updates the order relation information table 22, based on the trace information stored in the trace information DB 20. A detailed configuration of the order information updating unit 11 will be explained later.

The data race detecting unit 12 is a function realized by executing a data race detection program in the system 2. When the trace information stored in the trace information DB 20 is information related to the memory access, the data race detecting unit 12 outputs a detection result by performing the data race detection process, based on the TID-vec_ID correspondence table 21 and the order relation information table 22. The data race detecting unit 12 also updates the address state information table 23.

The trace information DB 20 is a database that stores therein the trace information, and stored in the memory M20 of the system 2. The order relation information table 22 stores therein order relation information, and stored in the memory M20. The address state information table 23 stores therein address state information, and stored in the memory M20. The TID-vec_ID correspondence table 21 is a table of correspondence relations between the thread and the vector, and stored in the memory M20. Data configurations of the trace information, the order relation information, the address state information, and the TID-vec_ID correspondence table 21 will now respectively be explained.

FIG. 6 is an explanatory table of a data configuration of trace information. FIG. 6 exemplifies the trace information when the five threads T1 through T5 shown in FIG. 4 are executed in parallel. The trace information is created in the system 1 with each occurrence of event, transferred to the system 2, and stored in the trace information DB 20. In FIG. 6, the trace information is arranged from top to bottom in a reverse chronological order of events. There are two types of events: a synchronization process "sync" and a memory access "mem". The event type of the synchronization process includes "Start", "Awake", "Create", "Signal", and "Finish". Among these, "Create" and "Signal" are synchronization source processes, and "Start" and "Awake" are synchronization destination processes. The event type of the memory access includes "Write" and "Read". The event names such as "Start", "Awake", "Create", "Signal", "Finish", "Write", and "Read" are used for descriptive purposes. As shown in FIG. 6, the trace information includes an ID (TID) of a thread that generates an event, an ID (PID) of a processor that executes the thread when the generated event is "Start", an event type (event_type), and an event name (event_name). The trace information also includes a synchronization source identification ID (sync_src) when the event is "Start" or "Awake", a synchronization destination identification ID (sync_dst) when the event is "Create" or "Signal", and a memory address (mem_addr) of an access destination when the event type is the memory access. As for the PID of the respective processors in FIG. 1, a PID of the processor P11 is "1", a PID of the processor P12 is "2", and a PID of the processor P13 is "3". As for the synchronization source identification ID and the synchronization destination identification ID, a TID of a thread started anew in a relation from "Start" to "Create" is used, and a synchronization variable name is used in a relation from "Signal" to "Awake".

The processor ID (PID) included in the trace information corresponds to assigned destination processor information. An event name (event_name) when the event type (event_type) is "sync", a synchronization source identification ID (sync_src) when the event is "Start" or "Awake", and a synchronization destination identification ID (sync_dst) when the event is "Create" or "Signal" correspond to synchronization information.

FIG. 7 is an explanatory table of a data configuration of order relation information. The order relation information includes a vector made of a set of vec_ID and vec_value. The vec_ID indicates a vector ID, and takes an integer value. In the present embodiment, the number of the vec_ID is the same as the number of the processors that can execute the multi-thread program (here, processors P11 through P13). Here, because the number of the processors is three, the number of the vec_ID becomes three, and the value taken by the vec_ID is "1", "2", and "3", respectively. The vec_value includes a plurality of elements, and each element takes an integer value. The vec_value corresponds to an ordinal value. The vec_value initializes all the element values to "0", before the data race detection is started. The number of the elements included in the vec_value is determined before the data race detection is started. In the present embodiment, the number of the elements is three, which is the same as the number of the processors P11 through P13 that can execute the multi-thread program. The respective elements correspond to the processors P11 through P13 in the subsequent order.

In particular, the order relation information is defined by the data format that has three-dimensional data in each vec_ID, in other words, in each processor. The three-dimensional data includes elements respectively correspond to the processor P11 through P13 in the subsequent order. The data format shows an order relation assured by a synchronization process, which is related to the thread executed in a predetermined processor, as an ordinal value. The data format also includes a plurality of elements that show the order relation. The elements respectively indicate different order relations. The elements include a value that shows a relative order relation between the threads executed in a predetermined processor and the respective threads executed in the other processors, and a value that shows the order relations assured by the predetermined processor using the synchronization process related to the threads executed by the predetermined processor in question. The element value that shows the order relation assured by the predetermined processor in question is incremented by the order information updating unit 11, when the thread executed by the predetermined processor generates the synchronization source process.

In particular, the data format includes three-dimensional data (y11, y12, and y13) that corresponds to vec_ID "1", three-dimensional data (y21, y22, and y23) that corresponds to vec_ID "2", and three-dimensional data (y31, Y32, and Y33) that corresponds to vec_ID "3". The y11, y12, and y13 are ordinal values that show order relations assured by the synchronization process related to the threads that are executed in the processor P11. The element y12 shows relative order relations among the threads executed in the processor P11 and the respective threads executed in the processor P12. The element y13 shows relative order relations among the threads executed in the processor P11 and the respective threads executed in the processor P13. The element y11 shows the order relations assured by the processor P11 using the synchronization process related to the threads executed by the processor P11 in question. The value of the element y11 is incremented when the threads executed by the processor P11 generate the synchronization source process. The y21, y22, and y23 are ordinal values that show the order relations assured by the synchronization process related to the threads that are executed in the processor P12. The element y21 shows relative order relations among the threads executed in the processor P12 and the respective threads executed in the processor P11. The element y23 shows the relative order relations among the threads executed in the processor P12 and the respective threads executed in the processor P13. The element y22 shows the order relations assured by the processor P12 using the synchronization process related to the threads executed by the processor P12 in question. The value of the element y22 is incremented when the threads executed by the processor P12 generate the synchronization source process. The y31, y32, and y33 are ordinal values that show the order relations assured by the synchronization process related to the threads, which are executed in the processor P13. The element y31 shows the relative order relations among the threads executed in the processor P13 and the respective threads executed in the processor P11. The element y32 shows the relative order relations among the threads executed in the processor P13 and the respective threads executed in the processor P12. The element y33 shows the order relations assured by the processor P13 using the synchronization process related to the threads that are executed by the processor P13 in question. The value of the element y33 is incremented when the threads executed by the processor P13 generate the synchronization source process. An operation that the order information updating unit 11 increments the values of the respective elements y11, y22, and y33 will be explained in detail below in an operation section.

Figures 8, 9, 10:
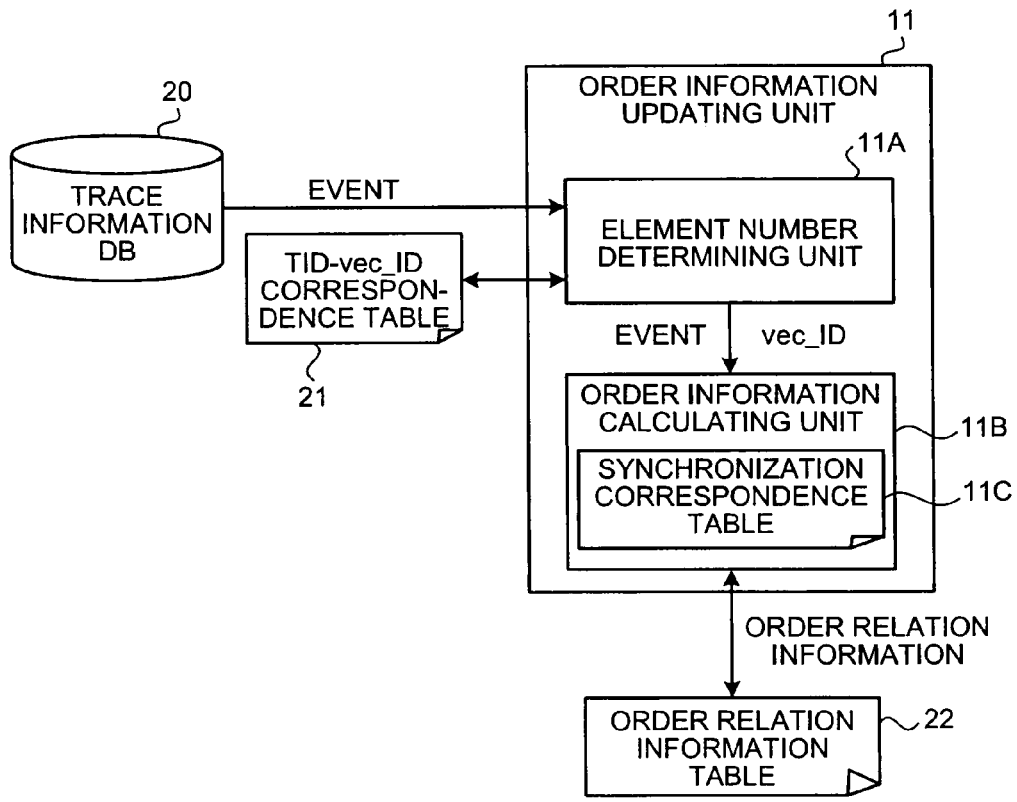
FIG. 8 is an explanatory table of a data configuration of address state information.
FIG. 9 is an explanatory table of a data configuration of a TID-vec_ID correspondence table.
FIG. 10 is a block diagram of a detailed configuration of an order information updating unit 11.

FIG. 8 is an explanatory table of a data configuration of address state information. The address state information is information to store access history of each memory address, and includes a memory address to be accessed and a set of "Last Write" and "Last Read". The "Last Write" indicates a vector that was last written to the target memory address, and includes vec_ID and elem_value. The "Last Read" indicates a vector that was last read from the target memory address, and includes vec_ID and elem_value. The elem_value is one of the elements included in the vec_value, and shows a value taken by the element corresponding to the execution processor, which is executing the thread. The data configuration of the address state information, for example, may be applied to various methods such as the one disclosed in the Document 1.

FIG. 9 is an explanatory table of a data configuration of a TID-vec_ID correspondence table. The TID-vec_ID correspondence table 21 includes a set of a thread ID (TID) and a vector ID (vec_ID) assigned to the thread.

A detailed configuration of the order information updating unit 11 will now be explained. FIG. 10 is a block diagram of a detailed configuration of the order information updating unit 11. The order information updating unit 11 includes an element number determining unit 11A and an order information calculating unit 11B. The order information calculating unit 11B includes a synchronization correspondence table 11C.

The element number determining unit 11A acquires first event information among the trace information stored in the trace information DB 20. The first event information is event information related to the oldest event and the type is a synchronization process. Based on the first event information, the element number determining unit 11A specifies vec_ID by referring to the TID-vec_ID correspondence table 21, and delivers the vec_ID and the first event information to the order information calculating unit 11B. The first event information includes a thread ID (TID), a processor ID (PID), an event name (event_name), a synchronization source identification ID (sync_src), and a synchronization destination identification ID (sync_dst), in a line of information in the trace information shown in FIG. 6. The order information calculating unit 11B stores the synchronization information in the synchronization correspondence table 11C based on the vec_ID and the first event information, and updates the order relation information table 22.

Figures 11, 12:
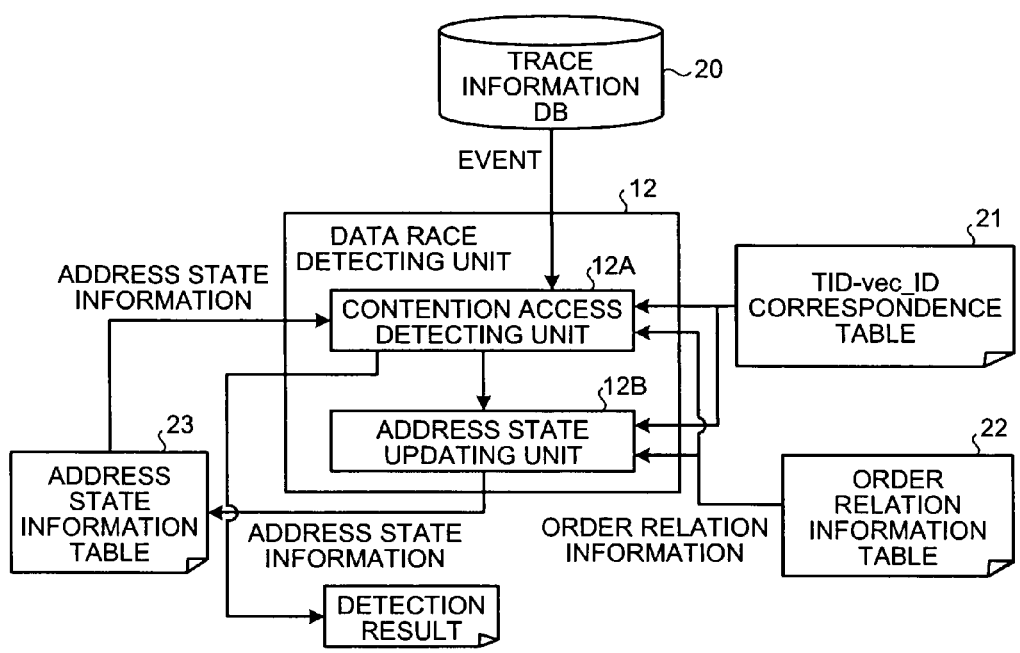
FIG. 11 is an explanatory table of a data configuration of a synchronization correspondence table 11C.
FIG. 12 is a block diagram of a detailed configuration of a data race detecting unit 12.

FIG. 11 is an explanatory table of a data configuration of the synchronization correspondence table 11C. The synchronization correspondence table 11C, for example, is stored in the memory M20 and stores therein the synchronization information. When an event ("Create" or "Signal") that becomes the synchronization source process is generated as the synchronization process while the thread is being executed, the synchronization correspondence table 11C stores the vec_value in the order relation information table 22 as information of the synchronization source (synchronization information), according to the vector corresponding to the synchronization destination identification ID (sync_dst) and the thread. The order information calculating unit 11B stores the synchronization information in the synchronization correspondence table 11C, until the event, which becomes the synchronization destination process ("Start" or "Awake"), is processed.

A detailed configuration of the data race detecting unit 12 will now be explained. FIG. 12 is a block diagram of a detailed configuration of the data race detecting unit 12. The data race detecting unit 12 includes a contention access detecting unit 12A and an address state updating unit 12B. The contention access detecting unit 12A acquires second event information among the trace information stored in the trace information DB 20. The second event information is event information related to the oldest event, the type of which is a memory access. Based on the second event information, the contention access detecting unit 12A performs a data race detection process. The second event information includes a thread ID (TID), an event name (event_name), and a memory address (mem_addr), in a line of information of the trace information shown in FIG. 6. After the contention access detecting unit 12A performs the data race detection process, the address state updating unit 12B updates the address state information table 23 by referring to the TID-vec_ID correspondence table 21 and the order relation information table 22, based on the second event information.

Figure 13:
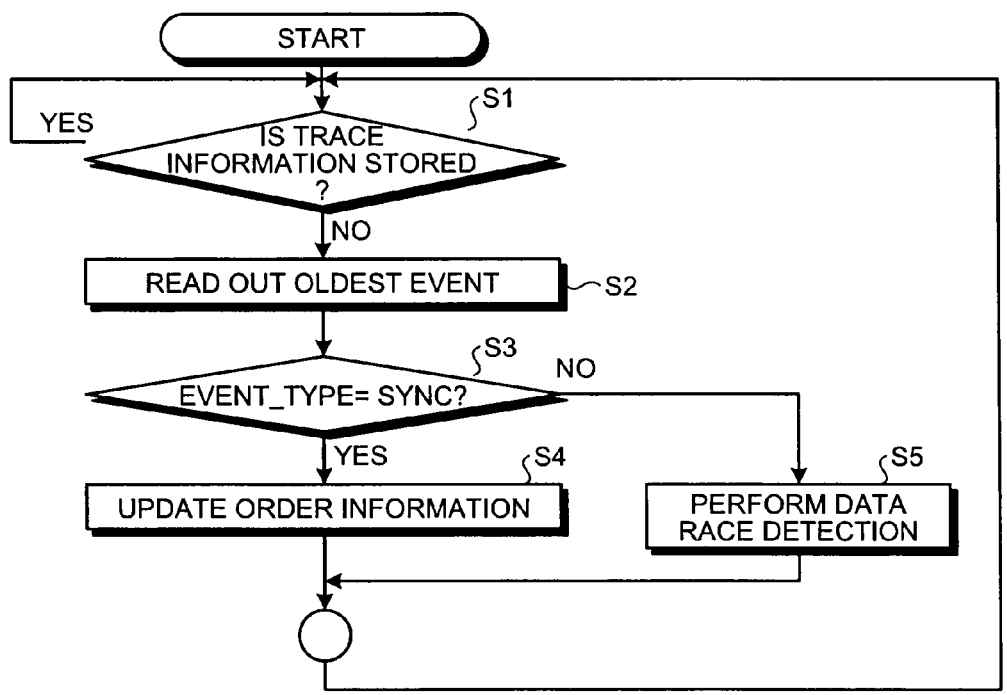
FIG. 13 is a flowchart of a schematic procedure of a process performed by the analysis system SYM.

An operation performed by the analysis system SYM according to the present embodiment will now be explained. A schematic procedure of a process performed by the analysis system SYM will be explained first. FIG. 13 is a flowchart of a schematic procedure of a process performed by the analysis system SYM. The analysis system SYM, when the trace information is stored in the trace information DB 20 (NO at Step S1), reads out the trace information of the oldest event (Step S2), and determines the type of event (Step S3), using the event type (event_type) included in the trace information. When the event type (event_type) is the synchronization process (sync), the order information updating unit 11 performs an order information update process by acquiring the first event information from the trace information, and updates the order relation information table 22 (Step S4). When the event type (event_type) is a memory access (mem), the data race detecting unit 12 acquires the second event information from the trace information, outputs the detection result by performing a data race detection process, and updates the address state information table 23 (Step S5). As described above, the analysis system SYM checks the trace information that is stored in the trace information DB 20 in chronological order of events, and performs the order information update process or the data race detection process as appropriate.

Figure 14:
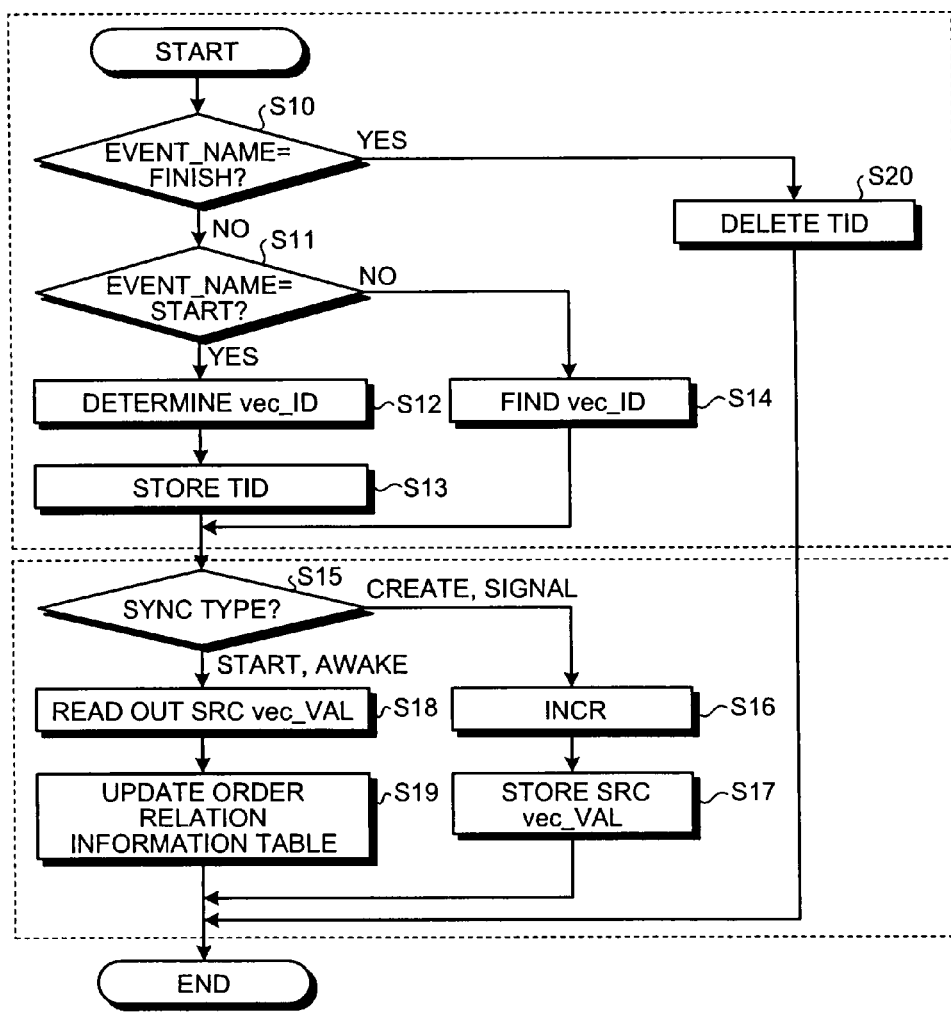
FIG. 14 is a flowchart of a procedure of an order information update process.

FIG. 14 is a flowchart of a procedure of the order information update process. The element number determining unit 11A of the order information updating unit 11 acquires the first event information, and determines whether an event name (event_name) included in the first event information is "Finish" (Step S10). If the determination result is positive, the element number determining unit 11A deletes an entry corresponding to the TID, which is included in the event information, from the TID-vec_ID correspondence table 21 (Step S20), and finishes the process.

If the determination result at Step S10 is negative, the element number determining unit 11A determines whether the event name (event_name) is "Start" (Step S11). If the determination result is positive, the execution of the thread starts. Therefore, the element number determining unit 11A determines the PID, which is included in the first event information, as vec_ID to be assigned to the thread (Step S12). The element number determining unit 11A then stores a set of the TID included in the first event information and the vec_ID determined at Step S12 in the TID-vec_ID correspondence table 21, and delivers the vec_ID and the first event information to the order information calculating unit 11B (Step S13). Then, the process proceeds to Step S15. If the determination result at Step S11 is negative, the element number determining unit 11A searches vec_ID corresponding to the TID, which is included in the first event information, by referring to the TID-vec_ID correspondence table 21. The element number determining unit 11A then delivers the vec_ID, which is found by the search, and the event information to the order information calculating unit 11B (Step S14). Then, the process proceeds to Step S15.

At Step S15, the order information calculating unit 11B determines the event name (event_name), which is included in the first event information. If the event name (event_name) is determined to be "Create" or "Signal", the order information calculating unit 11B increments the element value by one, with respect to the vec_value corresponding to the vec_ID, in the order relation information table 22 (Step S16). The element value is the same ordinal number as the vec_ID. The order information calculating unit 11B also stores a set of the synchronization destination identification ID included in the event information and the vec_value incremented at Step 16, as a set of a synchronization destination identification ID and src_vec_value, in the synchronization correspondence table 11C (Step S17). If the event name (event_name) is determined to be "Start" or "Awake" at Step S15, the order information calculating unit 11B searches the synchronization destination identification ID that indicates the same ID as the synchronization source identification ID, which is shown by the sync_src included in the first event information, by referring to the synchronization correspondence table 11C. Then, the order information calculating unit 11B reads out the src_vec_value corresponding to the synchronization destination identification ID (Step S18). The order information calculating unit 11B then deletes the entry from the synchronization correspondence table 11C. Then, the order information calculating unit 11B compares the respective elements with respect to a vector value indicated by the src_vec_value, which is read out at Step S18, and a vector value indicated by the vec_value corresponding to the vec_ID in the order relation information table 22. The order information calculating unit 11B then updates the order relation information table 22 using the larger element as a new value of vec_value that corresponds to the vec_ID (Step S19).

However, when the synchronization destination ID that shows the same ID as the synchronization source identification ID indicated by the sync_src, which is included in the event information, and the src_vec_value that corresponds to the synchronization destination identification ID, are not stored in the synchronization correspondence table 11C, at Step S19, the order information calculating unit 11B updates the order relation information table 22 by using a value of the vec_value corresponding to the vec_ID in the order relation information table 22, as a new value for the vec_value.

As the above, in the present embodiment, an analysis is performed by using the vec_ID determined based on the PID, which the thread is being executed, instead of the TID of the thread that the order relation is to be analyzed. By taking over the vec_value that was acquired by the preceding thread, which is assigned with the same vec_ID, when the synchronization process was "Start", the preceding thread and the newly started thread are considered to be a continuous segment of the same thread. The other update method of the vec_value is not limited. For example, in the present embodiment, the corresponding vec_value is updated every time the synchronization process occurs. However, the update of the vec_value may be performed by increment in the other events. Also, an integer value equal to or more than "2" may be added during the increment.

Figure 15:
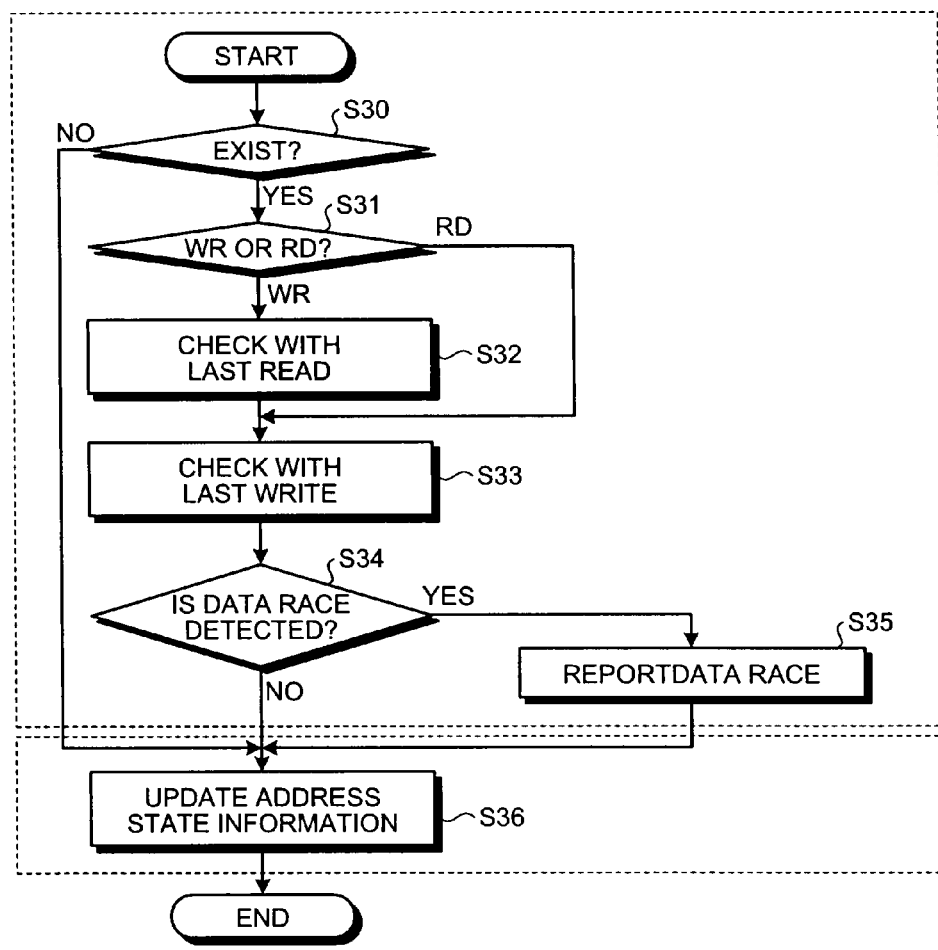
FIG. 15 is a flowchart of a procedure of a data race detection process.

FIG. 15 is a flowchart of a procedure of a data race detection process. The contention access detecting unit 12A of the data race detecting unit 12 acquires the second event information, and determines whether address state information related to the memory address, which is the same as the memory address (mem_addr) included in the second event information, already exists in the address state information table 23 (Step S30). If the determination result is negative, proceed to Step S36. If the determination result at Step S30 is positive, the contention access detecting unit 12A determines whether an event name (event_name) included in the second event information is "Write" or "Read" (Step S31). If the event name (event_name) is determined to be "Write", the contention access detecting unit 12A performs a contention determination process with respect to the "Last Read", which is included in the address state information (Step S32). This process is performed by referring to the address state information related to the memory address, which is the same as the memory address (mem_addr) included in the second event information, among the address state information stored in the address state information table 23.

Figure 16:
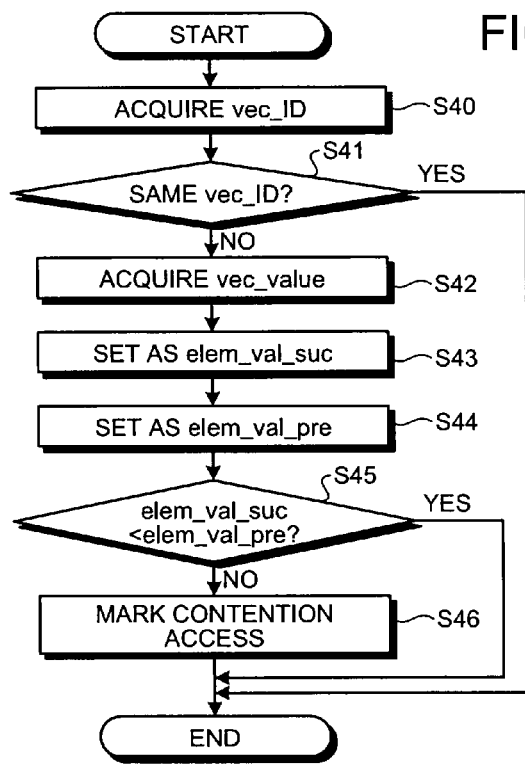
FIG. 16 is a flowchart of a procedure of a contention determination process.

FIG. 16 is a flowchart of a procedure of a contention determination process. The contention access detecting unit 12A acquires vec_ID corresponding to the TID, which is included in the second event information, by referring to the TID-vec_ID correspondence table 21 (Step S40). Then, the contention access detecting unit 12A determines whether the vec_ID acquired at Step S40 and the vec_ID of the "Last Read" that is included in the address state information stored in the address state information table 23 are the same (Step S41). If the determination result is positive, the contention access detecting unit 12A finishes the contention determination process. If the determination result at Step S41 is negative, the contention access detecting unit 12A acquires vec_value corresponding to the vec_ID acquired at Step S40, by referring to the order relation information table 22 (Step S42). Then, the contention access detecting unit 12A acquires an element value that is the same ordinal number as the vec_ID of the "Last Read", which is included in the address state information, from the vec_value acquired at step S42, and sets as elem_val_suc (Step S43). The contention access detecting unit 12A also sets the value indicated by elem_value of the "Last Read", which is included in the address state information, as elem_val_pre (Step S44). Then, the contention access detecting unit 12A determines whether the elem_val_suc is equal to or less than the elem_val_pre (Step S45). If the elem_val_suc is determined to be equal to or less than the elem_val_pre (NO at Step S45), the contention access detecting unit 12A marks a generation of the contention access (Step S46). If the elem_val_suc is determined to be larger than the elem_val_pre (YES at Step S45), the contention access detecting unit 12A finishes the contention determination process.

Returning to FIG. 15, if the event name (event_name) is determined to be "Read" at Step S31, or after finishing Step S32 by determining the event name to be "Write" at Step S31, the contention access detecting unit 12A performs a contention determination process with respect to the "Last Write", which is included in the address state information (Step S33). This process is performed by referring to the address state information related to the memory address, which is the same as the memory address (mem_addr) included in the second event information, from the address state information stored in the address state information table 23. Because the procedure of the contention determination process with respect to the "Last Write" is substantially the same as the one shown in FIG. 15, drawings and descriptions thereof are omitted. The difference to the contention determination process with respect to the "Last Read" is that, at Step S43, the contention access detecting unit 12A acquires the element value, which is the same ordinal number as the vec_ID of the "Last Write" in the address state information table 23 from the vec_value acquired at Step S42.

Proceeds to Step S34, after Step S33. At Step S34, the contention access detecting unit 12A determines whether the data races are detected. When the generation of the contention access is marked at Step S35 in FIG. 15, the determination result becomes positive. In this case, the contention access detecting unit 12A reports the generation of the data races and proceeds to Step S36. If the determination result at Step S34 is negative, in other words, if the generation of the contention access is not marked, proceeds to Step S36. At Step S36, the address state updating unit 12B updates the address state information corresponding to the memory address, which is the same as the memory address (mem_addr) included in the second event information, in the address state information table 23.

Figure 17:
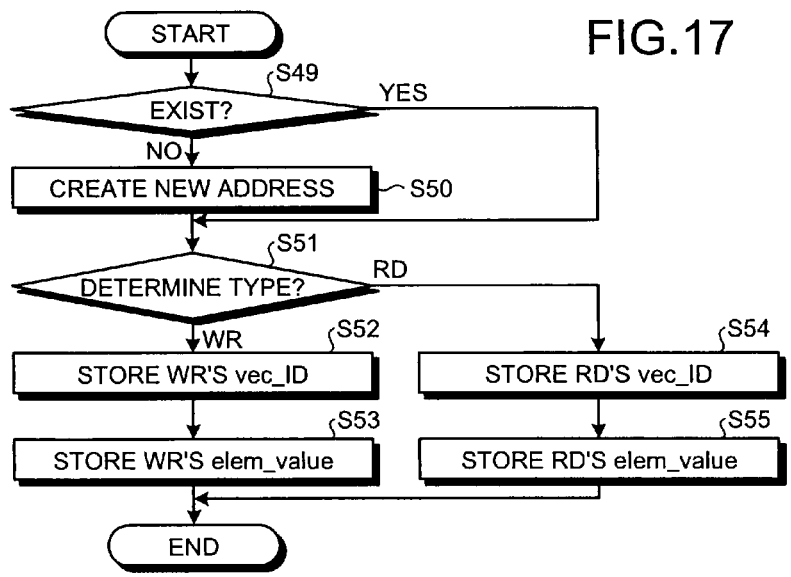
FIG. 17 is a flowchart of a procedure of a process to update the address state information.

FIG. 17 is a flowchart of a procedure of a process to update the address state information. When the address state information corresponding to the memory address, which is the same as the memory address (mem_addr) included in the second event information, does not exist in the address state information table 23 (NO at Step S49), the address state updating unit 12B creates new address state information corresponding to the memory address, and registers the new address state information in the address state information table 23 (Step S50). The address state updating unit 12B then determines whether the type of the access with respect to the memory address is "Write" or "Read", by referring to the event name (event_name), which is included in the second event information (Step S51). If the event name (event_name) is determined to be "Write", the address state updating unit 12B acquires vec_ID corresponding to the TID, which is included in the second event information, and stores the vec_ID in the "Last Write" of the address state information (Step S52). The address state updating unit 12B acquires vec_value corresponding to the vec_ID acquired at Step S52, by referring to the order relation information table 22. The address state updating unit 12B then stores therein an element value, which is the same ordinal number as the vec_ID, among the elements included in the vec_value, as elem_value of the "Last Write" of the address state information (Step S53).

If the event name (event_name) is determined to be "Read" at Step S51, the address state updating unit 12B acquires vec_ID corresponding to the TID, which is included in the second event information, from the TID-vec_ID correspondence table 21, and stores the vec_ID in the "Last Read" of the address state information (Step S54). The address state updating unit 12B acquires vec_value corresponding to the vec_ID acquired at Step S54, by referring to the order relation information table 22. The address state updating unit 12B then stores therein an element value, which is the same ordinal number as the vec_ID, among the elements included in the vec_value, as elem_value of the "Last Read" of the address state information (Step S55).

In the present embodiment, a method of the data race detection process and a method of processing an update of the address state information are not limited to the above, and may apply various methods such as the one disclosed in the Document 1. However, the analysis is performed using the vec_ID instead of directly using the TID, when these methods are applied.

FIGS. 18 through 20 are tables respectively showing update states of the order relation information table 22, the TID-vec_ID correspondence table 21, and the address state information table 23, based on the trace information shown in FIG. 6. In FIG. 20, results of the data race detection process with respect to the memory access to a memory address "0x1000" are also shown. In the respective tables, the leftmost column (event) is a label showing a type of the event in a simplified manner. The label corresponds one-to-one to the trace information shown in FIG. 6 with each line, and shows value of the respective information when the event, which is shown by the label with each line, occurs. The label of "init" shown in the first line shown in FIG. 18 indicates an initial process. The second label "Start T1@P1" shows that the processor P11 of PID "P1" has started an execution of the thread T1, as an event. The third label "Start T2@P3" shows that the processor P13 of PID "P3" has started an execution of the thread T2, as an event. The fourth label "Create T2+T3" shows that the thread T2 has created the thread T3, as an event. The fifth label "WR 0x1000@T2" shows that the thread T2 writes to a memory address "0x1000", as an event. In the remaining lines, how the respective information is updated is shown, only when updated. In the order relation information table 22 shown in FIG. 18, the events related to the memory access are shown in gray shades, because they are not particularly relevant with the update of the vec_value. In the address state information table 23 shown in FIG. 20, the events related to the synchronization process are shown in gray shades, because they are not particularly relevant with the update of the address state information. In the TID-vec_ID correspondence table 21, only a period between the creation and deletion of the entry, which is related to the respective TIDs, is shown in white, and the section that the entry itself does not exist is shown in gray shades.

How the respective information is updated in chronological order of events and how data races are detected are explained below, by following the procedures explained in the operation section.

(init)

As an initial process, the order information updating unit 11 stores therein the vec_value with respect to all the vec_ID in the order relation information table 22, so as the number of elements are three and the respective values are (0, 0, 0) of "0".

(Start T1@P1)

An event type (event_type) included in the first line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T1", a processor ID "1", an event name (event_name) "Start", a synchronization source identification ID (sync_src) "null", and a synchronization destination identification ID (sync_dst) "null", as the first event information. Because the event name (event_name) is "Start" (YES at Step S11 in FIG. 14), the element number determining unit 11A determines the PID "1", which is included in the event information, as the vec_ID being assigned to the thread (Step S12). Then, the element number determining unit 11A stores a set of the TID "T1", which is included in the event information, and the vec_ID "1" determined at Step S12 in the TID-vec_ID correspondence table 21, and deliver the vec_ID "1" and the event information to the order information calculating unit 11B (Step S13). Because the event name (event_name) is "Start" (Start at Step S15), the order information calculating unit 11B searches src_TID that shows the same ID as the thread ID indicated by the sync_src, which is included in the first event information, by referring to the synchronization correspondence table 11C. Because a synchronization destination identification ID and src_vec_value that corresponds to the synchronization destination identification ID, are not yet stored in the synchronization correspondence table 11C, the order information calculating unit 11B updates the vec_value that corresponds to the vec_ID "1" in the order relation information table 22, so as to be (0, 0, 0) (Steps S18 and S19).

(Start T2@P3)

An event type (event_type) included in the second line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T2", a processor ID "3", an event name (event_name) "Start", a synchronization source identification ID (sync_src) "null", and a synchronization destination identification ID (sync_dst) "null", as the first event information. Because the event name (event_name) is "Start" (YES at Step S11 in FIG. 14), the element number determining unit 11A determines the PID "3", which is included in the event information, as vec_ID being assigned to the thread (Step S12). The element number determining unit 11A then stores a set of the TID "T2", which is included in the event information, and the vec_ID "3" determined at Step S12 in the TID-vec_ID correspondence table 21, and delivers the vec_ID "1" and the event information to the order information calculating unit 11B (Step S13). Then, because the event name (event_name) is "Start" (Start at Step S15), the order information calculating unit 11B searches a synchronization destination identification ID that shows the same ID as the synchronization source identification ID indicated by the sync-src, which is included in the first event information, by referring to the synchronization correspondence table 11C. Because a synchronization destination identification ID and src_vec_value that corresponds to the synchronization destination ID are not yet stored in the synchronization correspondence table 11C, the order information calculating unit 11B updates the vec_value that corresponds to the vec_ID "3" in the order relation information table 22, so as to be (0, 0, 0) (Steps S18 and S19).

(Create T2→T3)

An event type (event_type) included in the third line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T2", a processor ID "null", an event name (event_name) "Create", a synchronization source identification ID (sync_src) "null", and a synchronization destination identification ID (sync_dst) "T3", as the first event information. Because the event name (event_name) is "Create" (NO at Step S11 and Create at Step S15 in FIG. 14), the element number determining unit 11A searches vec_ID corresponding to the TID "T2", which is included in the event information, by referring to the TID-vec_ID correspondence table 21. The element number determining unit 11A then delivers the vec_ID "3", which is found by the search, and the event information to the order information calculating unit 11B (Step S14). The order information calculating unit 11B increments the element value, which is the same ordinal number (third) as the vec_ID "3", by one, with respect to the vec_value (0, 0, 0) corresponding to the vec_ID "3" in the order relation information table 22, so as to be (0, 0, 1) (Step S16). Then, the order information calculating unit 11B stores a set of the synchronization destination identification ID "T3", which is included in the first event information, and the vec_value (0, 0, 1), which is incremented at Step S16, in the synchronization corresponding table 11C, as a set of the synchronization destination identification ID and the src_vec_value (Step S17).

(WR 0x1000@T2)

An event type (event_type) included in the fourth line of the trace information shown in FIG. 6 is "mem", and shows that the event type is a memory access. Therefore, the data race detecting unit 12 starts the data race detection process. The contention access detecting unit 12A of the data race detecting unit 12 acquires a thread ID (TID) "T2", an event name (event_name) "Write", and a memory address (mem_addr) "0x1000", as the second event information. Then, the contention access detecting unit 12A determines whether address state information related to the memory address "0x1000" already exists in the address state information table 23 (Step S30 in FIG. 15). In this case, because the address state information does not exist in the address state information table 23, proceed to Step S36, under an assumption that the data races do not occur. As a specific process of Step S36, at Step S50 in FIG. 17, the address state updating unit 12B registers the address state information related to the memory address "0x1000" in the address state information table 23. Because the type of the memory access is "Write", at Step S52, the address state updating unit 12B acquires vec_ID "3" corresponding to the TID "T2", which is included in the event information, by referring to the TID-vec_ID correspondence table 21. The address state updating unit 12B then stores the value "3" as vec_ID of the "Last Write" of the address information, which is related to the memory address "0x1000". Further, the address state updating unit 12B calculates an element value "1", which is the same ordinal number (third) as the vec_ID, by referring to the vec_value (0, 0, 1) corresponding to the vec_ID "3" of the order relation information, which is stored in the order relation information table 22. Then, the address state updating unit 12B stores the value "1" as elem_value of the "Last Write" of the address state information, which is related to the memory address "00x1000" (Step S53).

(Start T3@P2)

An event type (event_type) included in the fifth line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T3", a processor ID "2", an event name (event_name) "Start", a synchronization source identification ID (sync_src) "T3", and a synchronization destination identification ID (sync_dst) "null", as the first event information. Because the event name (event_name) is "Start" (YES at Step S11 in FIG. 14), the element number determining unit 11A determines the PID "2", which is included in the event information, as the vec_ID to be assigned to the thread (Step S12). The element number determining unit 11A stores a set of the TID "T3", which is included in the event information, and the vec_ID "2" determined at Step S12 in the TID-vec_ID correspondence table 21, and delivers the vec_ID "2" and the event information to the order information calculating unit 11B (Step S13). Because the event name (event_name) is "Start" (Start at Step S15), the order information calculating unit 11B searches a synchronization destination identification ID that indicates the same ID as the synchronization source identification ID shown by the sync_src, which is included in the first event information, by referring to the synchronization correspondence table 11C (Step S18). A synchronization destination identification ID "T3", and src_vec_value (0, 0, 1) that corresponds to the synchronization destination identification ID, are stored in the synchronization correspondence table 11C. Accordingly, the order information calculating unit 11B determines the size relationship between the respective elements of the src_vec_value (0, 0, 1) and the vec_value (0, 0, 0) that corresponds to the vec_ID "2" in the order relation information table 22. Then, the order information calculating unit 11B respectively selects the larger value, acquires (0, 0, 1), and sets the value as the vec_value of the order relation information corresponding to the vec_ID "2" which is stored in the order relation information table 22 (Step S19). The order information calculating unit 11B also deletes the entry of the synchronization correspondence table 11C being referred.

(Finish T2)

An event type (event_type) included in the sixth line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T2", a processor ID "null", an event name (event_name) "Finish", a synchronization source identification ID (sync_src) "null", and a synchronization destination identification ID (sync_dst) "null", as the first event information. Because the event name (event_name) is "Finish" (YES at Step S10 in FIG. 14), the element number determining unit 11A deletes the entry related to the TID "T2" from the TID-vec_ID correspondence table 21 (Step S20).

(Signal T1→T3)

An event type (event_type) included in the seventh line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T1", a processor ID "null", an event name (event_name) "Signal", a synchronization source identification ID (sync_src) "null", and a synchronization destination identification ID (sync_dst) "SIG1", as the first event information. Because the event name (event_name) is "Signal" (NO at Step S11 and Signal at Step S15 in FIG. 14), the element number determining unit 11A searches vec_ID corresponding to the TID "T1", which is included in the event information, by referring to the TID-vec_ID correspondence table 21. The element number determining unit 11A then delivers the vec_ID "1", which is found by the search, and the event information to the order information calculating unit 11B (Step S14). The order information calculating unit 11B increments the element value, which is the same ordinal number (first) as the vec_ID "1", by one, with respect to the vec_value (0, 0, 0) corresponding to the vec_ID "1" in the order relation information table 22, so as to be (1, 0, 0) (Step S16). Then, the order information calculating unit 11B stores a set of the synchronization destination identification ID "SIG 1", which is included in the first event information, and the vec_value (1, 0, 0) incremented at Step S16, as a set of a synchronization destination identification ID and src_vec_value, in the synchronization correspondence table 11C (Step S17).

(Finish T1)

An event type (event_type) included in the eighth line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T1", a processor ID "null", an event name (event_name) "Finish", a synchronization source identification ID (sync_src) "null", and a synchronization destination identification ID (sync_dst) "null", as the first event information. Because the event name (event_name) is "Finish" (YES at Step S10 in FIG. 14), the element number determining unit 11A deletes the entry related to the TID "T1" from the TID-vec_ID correspondence table 21 (Step S20).

(Awake T1→T3)

An event type (event_type) included in the ninth line of the trace information shown in FIG. 6 is "sync", and shows that the event type is a synchronization process. Therefore, the order information updating unit 11 starts the order information update process. The element number determining unit 11A of the order information updating unit 11 acquires a thread ID (TID) "T3", a processor ID "null", an event name (event_name) "Awake", a synchronization source identification ID (sync_src) "SIG1", and a synchronization destination identification ID (sync_dst) "null", as the first event information. Because the event name (event_name) is "Awake" (NO at Step S11 and Awake at Step S15), the element number determining unit 11A acquires vec_ID "2" corresponding to the TID "T3", which is included in the event information, by referring to the TID-vec_ID correspondence table 21 (Step S14). The element number determining unit 11A then delivers the acquired vec_ID "2" and the event information to the order information calculating unit 11B. Here, the synchronization destination identification ID "SIG1" and src_vec_value (1, 0, 0) corresponding to the synchronization destination identification ID are stored in the synchronization correspondence table 11C. Therefore, the order information calculating unit 11B determines the size relationship between the respective elements of the src_vec_value (1, 0, 0) and the vec_value (0, 0, 1) corresponding to the vec_ID "2" in the order relation information table 22. Then, the order information calculating unit 11B selects the respective larger values, acquires (1, 0, 1), and set this as the vec_value corresponding to the vec_ID "2" of the order relation information, which is stored in the order relation information table 22 (Steps S18 and S19). The order information calculating unit 11B also deletes the entry of the synchronization correspondence table 11C being referred.

(RD 0x1000@T3)

An event type (event_type) included in the 10th line of the trace information shown in FIG. 6 is "mem", and shows that the event type is a memory access. Therefore, the data race detecting unit 12 starts the data race detection process. The contention access detecting unit 12A of the data race detecting unit 12 acquires a thread ID (TID) "T3", an event name (event_name) "Read", and a memory address (mem_addr) "0x1000", as the second event information. The contention access detecting unit 12A determines whether address state information related to the memory address "0x1000" already exists in the address state information table 23 (Step S30 in FIG. 15). Here, the entry exists in the address state information table 23 (YES at Step S30), and the event name (event_name) included in the event information is "Read"

(RD at Step S31). Accordingly, the contention access detecting unit 12A performs a contention determination process with respect to the "Last Write" of the address state information.

The contention access detecting unit 12A acquires vec_ID "2" corresponding to the TID "T3", which is included in the event information, by referring to the TID-vec_ID correspondence table 21 (Step S40 in FIG. 16). Then, the contention access detecting unit 12A determines whether the vec_ID "2" acquired at Step S40 and the vec_ID "3" of the "Last Write" of the address state information are the same (Step S41). Because the determination result is negative, the contention access detecting unit 12A acquires vec_value (1, 0, 1) corresponding to the vec_ID "2" acquired at Step S40, by referring to the order relation information table 22 (Step S42). Then, the contention access detecting unit 12A acquires an element value "1", which is the same ordinal number (third) as the vec_ID "3" of the "Last Write" of the address state information, from the vec_value (1, 0, 1) acquired at Step S42, so as to be elem_val_suc (Step S43). The contention access detecting unit 12A also sets a value indicated in elem_value "1" of the "Last Write" of the address state information, so as to be elem_val_pre (Step S44). Then, the contention access detecting unit 12A determines whether the elem_val_suc "1" is equal to or less than the elem_val_pre "1" (Step S45). Because the elem_val_suc is equal to or less than the elem_val_pre (NO at Step S45), the contention access detecting unit 12A marks a generation of the contention access (Step S46).

Then, the address state information proceeds to the update process. The address state updating unit 12B acquires vec_ID "2" corresponding to the TID "3", which is included in the second event information, by referring to the TID-vec_ID correspondence table 21. Then, the address state updating unit 12B stores the value "2" as the vec_ID of the "Last Read" of the address state information, which is related to the memory address "0x1000" (Step S54 in FIG. 17). The address state updating unit 12B also calculates an element value "0", which is the same ordinal number (second) as the vec_ID "2", by referring to the vec_value (1, 0, 1) corresponding to the vec_ID "2" of the order relation information. The order relation information is stored in the order relation information table 22. Then, the address state updating unit 12B stores the value "0" as elem_value of the "Last Read" section of the entry that is related to the memory address "0x1000" (Step S55).

The same procedures apply to the trace information after the 11th and subsequent lines shown in FIG. 6.

With the above configuration, the number of elements of the vector (the number of elements of vec_value) to represent order relations among threads in the order relation information are limited to the same number as the processors. The vec_ID is associated with the threads, so as the respective elements are mutually exclusive with each processor. Accordingly, a memory capacity required for analyzing order relations among the threads can be saved, and omission of information caused by reuse of elements can be prevented. An amount of calculation to update the vector, which is performed by comparing respective elements, can also be reduced.

According to the order relations among threads obtained by the present embodiment, a part or all of the data races, which are detected by the order relations obtained by related art, can be detected, thereby preventing false detections. This is because, in addition to the synchronization relation that has actually occurred, synchronization relations among the threads that are assigned to the same vec_ID only seem to exist.

Various programs executed in the analysis system SYM according to the embodiment may be stored in the external memory devices M11 and M21, or may be stored in computer-readable memory media such as a CD-ROM, a flexible disk (FD), a CD-R, a digital versatile disk (DVD) in a file of an installable form or an executable form. The program may be formed so as to be stored in a computer connected to a network such as an internet, and provided by downloading via the network.

In the embodiment, the order relation analysis program and the data race detection program are treated as different programs. However, the two programs may be formed integrally.

In the embodiment, the function of the trace collecting unit 10 is formed so as to be realized by executing a predetermined program in the system 1. However, the program may be separately executed in the system 1 and the system 2. A part or all the functions of the trace collecting unit 10 may be implemented by hardware. Similarly, the respective functions of the order information updating unit 11 and the data race detecting unit 12 may be separately executed in the system 1 and the system 2, and a part or all the functions may be implemented by hardware.

In the embodiment, the analysis system SYM is separately formed by the system 1 and the system 2. However, the analysis system SYM may be formed integrally with the system 1 and the system 2. In this case, at least two or more functions of the trace collecting unit 10, the order information updating unit 11, and the data race detecting unit 12 may be combined to realize the configuration.

In the embodiment, the trace information is represented as a sequence of data. However, it is not limited to this, and the events generated with each processor of the system 1 may be stored as trace information, or the information related to the synchronization process and the information related to the memory access may be stored separately.

In the embodiment, among the trace information, the first event information is acquired by the order information updating unit 11, and the second event information is acquired by the data race detecting unit 12. However, the respective units may acquire the trace information itself, or the configuration of the information acquired by the respective units may be made the same.

In the embodiment, the processor P10, which functions as a scheduler, is provided in the system 1. However, the processor P10 may not be included, and the function of the scheduler may be realized by making at least one of the processors P11 through P13 to execute the schedule management program. Moreover, the function may be realized by mounting a function of the scheduler in an operation system and executing the system.

In the embodiment, at least two or more of the synchronization corresponding table 11C, the trace information DB 20, the TID-vec_ID correspondence table 21, the order relation information table 22, and the address state information table 23 may be stored in the same storing unit, or may be stored in different storing units, respectively.

Figure 21:
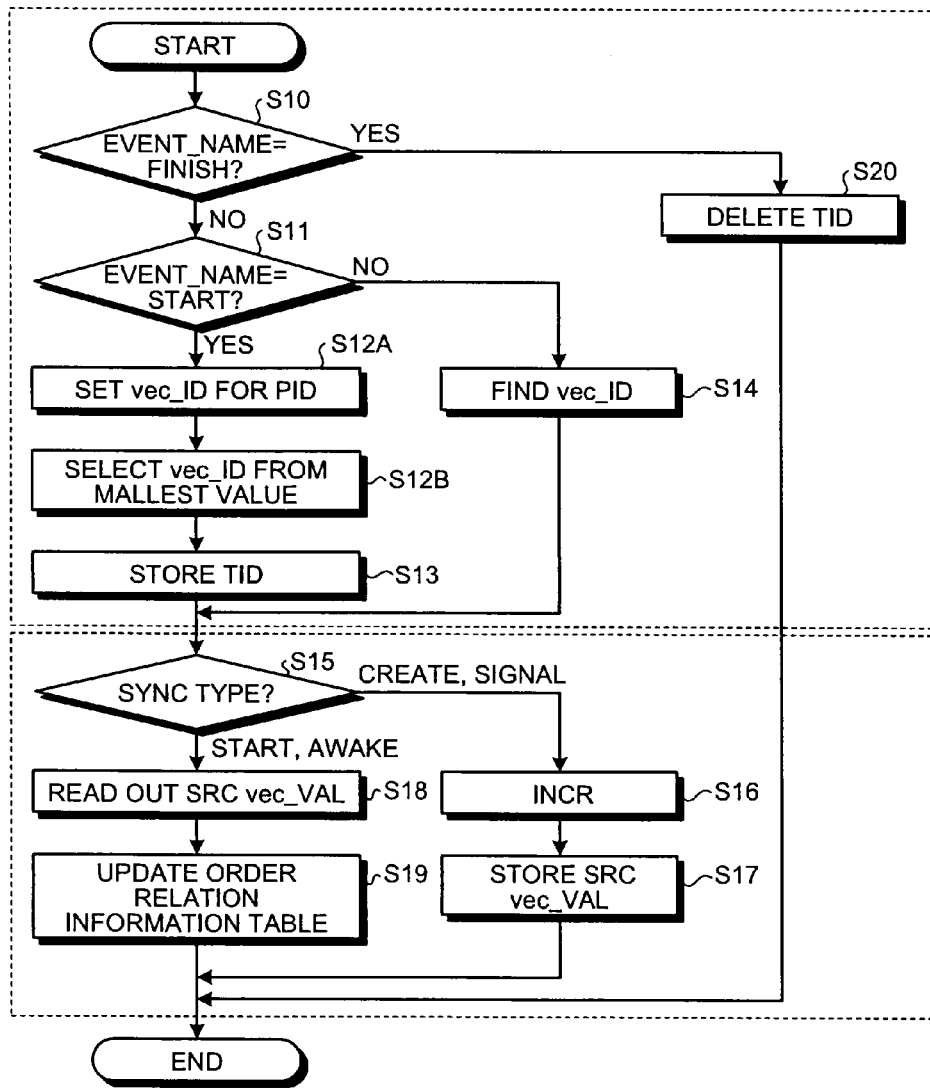
FIG. 21 is a flowchart of a procedure of an order information update process according to a modification of the present embodiment.

In the embodiment, the number of vec_ID is limited to the number of processors that can execute the multi-thread program. In other words, the number of vec_ID is limited to one-time to the number of processors. However, it is not limited to this, and the number of vec_ID may be made equal to N times of the number of processors (N is an integer equal to or more than 1). FIG. 21 is a flowchart of a procedure of an order information update process in this case. In the procedure of the order information update process according to FIG. 21, a procedure of selecting the vec_ID is different from the procedure of the order information update process shown in FIG. 14. Instead of Step S12 in FIG. 14, the element number determining unit 11A sets candidates for the vec_ID to be assigned to the thread, by using the PID, which is included in the first event information (Step S12A). More particularly, the element number determining unit 11A sets a value of N between (PID×N) and (PID×(N+1)-1) as a candidate for the vec_ID to which the threads can be assigned to. Then, the element number determining unit 11A selects the vec_ID in a round robin from the smallest value among the candidates of the vec_ID (Step S12B). For example, the vec_ID may be selected as follows:

With respect to a thread assigned first to an executable processor, a processor ID (PID)×N is selected as the vec_ID.

With respect to a thread assigned second to an executable processor, a processor ID (PID)×N+1 is selected as the vec_ID.

With respect to a thread assigned Nth to an executable processor, a processor ID (PID)×N is selected as the vec_ID.

FIGS. 22 through 24 are tables respectively showing update states of the order relation information table 22, the TID-vec_ID correspondence table 21, and the address state information table 23, based on the trace information shown in FIG. 6, when "N=2". With these results, an occurrence of data races (Race with WR) is detected, with respect to the last generated event "WR 0x1000@T4", as a result of the data race detection process shown in FIG. 15. In a first embodiment when "N=1", as shown in FIG. 20, an occurrence of data races is not detected with respect to the event "WR 0x1000@T4".

With the configuration, detectable data races may be increased, by increasing the value of N. Even if the value of N is increased as such, the number of elements of the vector, which is to represent order relations among the respective threads in the order relation information table 22, is limited by the number of processors and the value of N, and not by the number of threads. As a result, the memory capacity can be saved and the amount of calculation to update the vector can be reduced. A part or all of the data races, which are detected by the order relations obtained by related art, may also be detected by the configuration of the present modification, thereby preventing false detections.

In the present modification, the vec_ID is determined by preparing the exclusive vec_ID candidates of N for each processor ID (PID), with which the threads are executed, and selecting the candidates in a round robin every time the thread is executed. However, it is not limited to this, and a method of exclusively assigning the vec_ID corresponding to the PID being executed may be used. For example, various methods such as a method of assigning different numbers of vec_ID candidates with each PID, and a method of selecting and determining the vec_ID from the candidates by using the TID may be considered.

Figure 27:
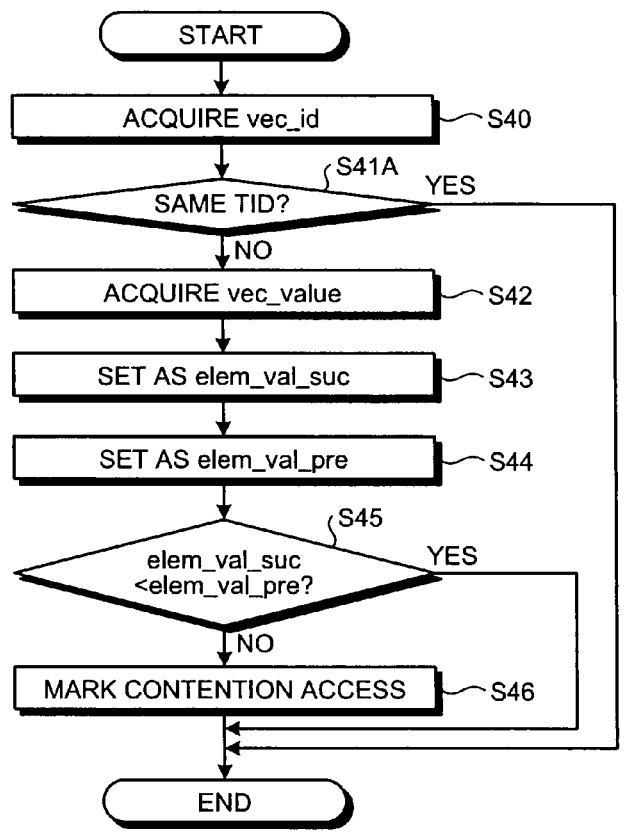
FIG. 27 is a flowchart of an alternative procedure of the contention determination process.

In the present embodiment, the data race detection is not performed among the threads that are assigned to the same vec_ID. However, the data race detection may be performed among the threads that are assigned to the same vec_ID. In this case, in the order relation information table 22, as well as the vec_value of each vec_ID, the thread ID (TID) that generates the event of the synchronization process, which updates the vec_value, is stored. FIG. 25 is an explanatory table of a data configuration of order relation information according to the present modification. In the address state information table 23, as well as the vec_ID and the elem_value, the thread ID (TID) that generates the event of the memory access, which updates the values of the vec_ID and the elem_value, are stored in the "Last Write" and the "Last Read". FIG. 26 is an explanatory table of a data configuration of the address state information according to the present modification. FIG. 27 is a flowchart of a procedure of a contention determination process according to the present modification. The procedure of the data race detection process shown in FIG. 27 is different from the procedure of the contention determination process shown in FIG. 16 in the following points. In the contention determination process shown in FIG. 16, at Step S42, the contention access detecting unit 12A determines whether the vec_ID acquired at Step S40 and the vec_ID of the "Last Read" section in the address state information table 23 are the same. However, in the contention determination process shown in FIG. 27, the contention access detecting unit 12A determines whether the TID included in the event information and the TID stored in the "Last Read" section in the address state information table 23 are the same (Step S41A). If the determination result is positive, the contention access detecting unit 12A finishes the contention access detection process, and if the determination result is negative, proceeds to Steps S42 and S44.

Figure 28:
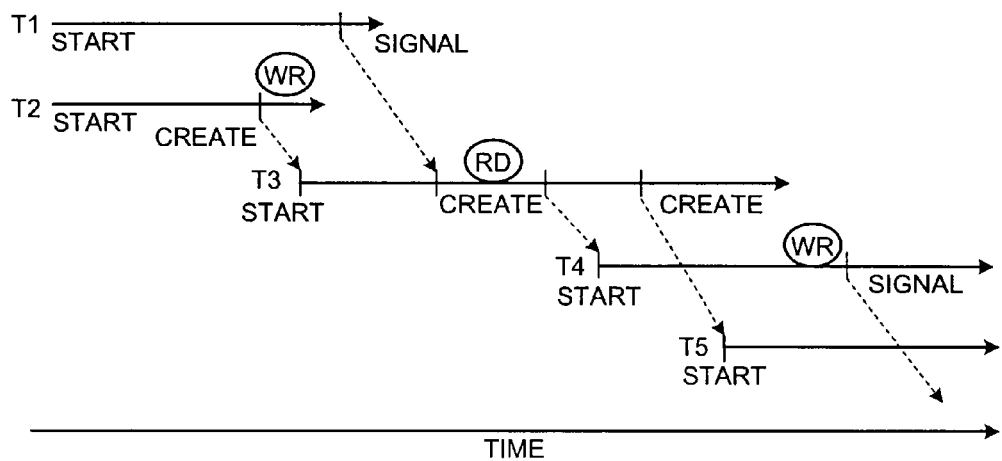
FIG. 28 is a schematic diagram of an execution example of the threads.

FIG. 28 is a schematic diagram of an execution example of the threads. In the configuration of the present modification, when the threads are executed as shown in FIG. 28, in the contention determination process shown in FIG. 26, an occurrence of data races can be detected both in the memory access (WR 0x1000@T4), which is the event executed in the thread T4, and the memory access (WR 0x1000@T2), which is the event executed in the thread T2. Because the two threads T2 and T4 are executed in the same processor P13 (PID=3), the data races are not detected in the embodiment.

Accordingly, the respective vectors of different threads, which are assigned with the same vec_ID, can be identified by maintaining the thread ID (TID) in the order relation information and the address state information, thereby enabling to detect data races among such threads. Moreover, a part or all of the data races, which are detected by the order relations obtained by related art, can be detected by the configuration the present modification, thereby preventing false detections.

In the embodiment, a plurality of threads, which are included in the multi-thread program, are used as a plurality of programs to analyze order relations. However, it is not limited to this, and a process and a program itself may be used, as long as the programs are operated in parallel and share a part of the memory space.

In the embodiment, the data format that includes three-dimensional data for each vec_ID, in other words, for each processor is used as the data format to define order relation information. The three-dimensional data includes elements that respectively correspond to the processors P11 through P13 in sequence. However, it is not limited to this, and the data format having a plurality of elements that represent the ordinal value of the program may also be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An order-relation analyzing apparatus that analyzes an order relation among a plurality of programs executed in parallel by a plurality of processors, respectively, the apparatus comprising:

a collecting unit that collects assigned destination processor information specifying a processor assigned with an execution of a program among the plurality of programs, and synchronization information, specifying an order of a synchronization process and the program, generated while executing the program;

a storing unit that stores a data format including a plurality of elements, each of the elements indicating an ordinal value of the program, the number of elements included in the data format being N×P, wherein N is an integer greater than or equal to one and P is a total number of the plurality of processors;

a determining unit that determines an element corresponding to the processor specified by the assigned destination processor information among the elements included in the data format, as an element associated with the program; and a calculating unit that calculates an ordinal value indicated by the element associated with the program, for each segment more than one that the program is divided into, based on the synchronization information, when the synchronization process occurs while executing the plurality of programs, wherein the calculating unit calculates the ordinal value indicated by the element so that a first segment of a second program is a segment that succeeds a last segment of a first program, when an element associated with the first program and an element associated with the second program are identical, the second program being started after the first program is finished.

2. The apparatus according to claim 1, wherein
the collecting unit further collects memory access information specifying a type of a memory access, an order of the memory access, a memory address of the memory access, and the program; and
the collecting unit further includes:
  a first detecting unit that analyzes a plurality of ordinal values indicated by a plurality of elements associated with a plurality of programs generating the memory access to the same memory address based on the memory access information, and detects as an exclusive control error, when the order relation among the plurality of programs is not established, wherein the first detecting unit includes:
    an updating unit that specifies the ordinal value indicated by the element associated with the program and calculated with respect to the segment including the memory access, by using the order of the memory access and the program specified by the memory access information, and updates address state information storing the type of the memory access and an access state of each memory address; and
    a second detecting unit that analyzes whether the order relation is established between the segment including a first memory access and the segment including the memory access being generated, when the memory access is generated while executing the program, by using the address state information updated with respect to the first memory access generated to the same memory address before generating the memory access, and the ordinal value calculated with respect to the segment including the memory access being generated.

3. The apparatus according to claim 2, wherein
the calculating unit calculates the ordinal value indicated by the element based on the synchronization information, when the synchronization process occurs while executing the program, and associates and stores the ordinal value indicated by the element and program identification information specifying the program in the storing unit;
the updating unit acquires the program identification information by using the order of the memory access and the program specified by the memory access information, specifies the ordinal value indicated by the element associated with the program and calculated with respect to the segment including the memory access, and updates the address state information that stores the type of the memory access and the access state of each memory address; and
the second detecting unit analyzes whether the order relation is established between the segment including the first memory access and the segment including the memory access being generated, when the memory access is generated while executing the program, by using the address state information updated with respect to the first memory access generated to the same memory address before generating the memory access, the ordinal value calculated with respect to the segment including the memory access being generated and stored in the data format, and the program identification information.

4. The apparatus according to claim 1, wherein
the synchronization information specifies the type of the synchronization process;
the type of the synchronization process is categorized into a synchronization source process and a synchronization destination process; and
the calculating unit increases the ordinal value indicated by the element associated with the program, and stores the ordinal value indicating the element in a second storing unit as synchronization correspondence information of the program, when the synchronization process occurs while executing the program and when the type of the synchronization process specified by the synchronization information is the synchronization source process, and updates the ordinal value indicated by the element, by using the ordinal value indicated by the element stored as the synchronization correspondence information of the program to synchronize based on the synchronization information, and the ordinal value indicated by the element determined by corresponding to the synchronization destination process, when the synchronization process occurs while executing the program and when the type of the synchronization process specified by the synchronization information is the synchronization destination process.

5. The apparatus according to claim 1, wherein the program is divided into more than one segment with every occurrence of the synchronization process.

6. The apparatus according to claim 1, wherein
the plurality of elements in the data format indicate an order relation assured by the synchronization process related to a program executed in a predetermined processor as the ordinal value;
the elements in the data format include a first element that indicates a relative order relation among the program executed in the predetermined processor and programs executed in the other processors, and a second element that indicates the order relation assured by the predetermined processor using the synchronization process related to the program executed by the predetermined processor; and the calculating unit updates the ordinal value indicated by the second element, when the synchronization source process occurs in which the program executed by the predetermined processor becomes a synchronization source.

7. An order-relation analyzing apparatus that analyzes an order relation among a plurality of programs executed in parallel by a plurality of processors, respectively, the apparatus comprising:
 a collecting unit that collects assigned destination processor information specifying a processor assigned with an execution of a program among the plurality of programs, synchronization information specifying an order of a synchronization process and the program generated while executing the program, and memory access information specifying a type of a memory access, an order of the memory access, a memory address of the memory access, and the program generated while executing the program;
 a determining unit that determines an element corresponding to the processor specified by the assigned destination processor information among a plurality of elements included in a data format, as an element associated with the program, each of the elements indicating an ordinal value of the program, the number of the elements in the data format being N×P, wherein N is an integer greater than or equal to one and P is a total number of the processors;
 a storing unit that stores the data format including the plurality of elements;
 a calculating unit that calculates an ordinal value indicated by the element associated with the program, for each segment that the program is divided into equal to or more than one, based on the synchronization information, when the synchronization process occurs while executing the program; and
 a first detecting unit that analyzes a plurality of ordinal values indicated by a plurality of elements associated with a plurality of programs generating the memory access to the same memory address, based on the memory access information, and detects as an exclusive control error, when the order relation among the plurality of programs is not established, wherein
 the calculating unit calculates the ordinal value indicated by the element, so that a first segment of a second program is a segment that succeeds a last segment of a first program, when an element associated with the first program and an element associated with the second program are identical, the second program being started after the first program is finished; and
 the first detecting unit includes:
 an updating unit that specifies the ordinal value indicated by the element associated with the program and calculated with respect to the segment including the memory access, by using the order of the memory access and the program specified by the memory access information, and updates address state information storing the type of the memory access and an access state of each memory address; and
 a second detecting unit that analyzes whether the order relation is established between the segment including a first memory access and the segment including the memory access being generated, by using the address state information updated with respect to the first memory access generated to the same memory address before generating the memory access, and the ordinal value calculated with respect to the segment including the memory access being generated, when the memory access is generated while executing the program.

8. The apparatus according to claim 7, wherein the program is divided into more than one segment with every occurrence of the synchronization process.

9. The apparatus according to claim 7, wherein
 the plurality of the elements in the data format indicate the order relation assured by the synchronization process related to the program executed in a predetermined processor as the ordinal value;
 the elements in the data format include a first element that indicates a relative order relation among the program executed in the predetermined processor and programs executed in the other processors, and a second element that indicates the order relation assured by the predetermined processor using the synchronization process related to the program executed by the predetermined processor; and
 the calculating unit updates the ordinal value indicated by the second element, when the synchronization source process occurs in which the program executed by the predetermined processor becomes a synchronization source.

10. An order-relation analyzing method that analyzes an order relation among a plurality of programs executed in parallel by a plurality of processors, respectively, executed in an order-relation analyzing apparatus including a collecting unit, a determining unit, and a calculating unit, the method comprising:
 collecting, by the collecting unit, assigned destination processor information specifying a processor assigned with an execution of a program among the plurality of programs, and synchronization information specifying an order of a synchronization process and the program, generated while executing the program;
 determining, by the determining unit, an element corresponding to the processor specified by the assigned destination processor information among a plurality of elements included in a data format, as an element associated with the program, each of the elements indicating an ordinal value of the program, a number of the elements included in the data format being N×P, wherein N is an integer greater than or equal to one and P is a total number of the plurality of processors; and
 calculating, by the calculating unit, an ordinal value indicated by the element associated with the program, for each segment more than one that the program is divided into, based on the synchronization information, when the synchronization process occurs while executing the program, wherein
 in the calculating, the ordinal value indicated by the element is calculated so that a first segment of a second program is a segment that succeeds a last segment of a first program, when an element associated with the first program and an element associated with the second program are identical, the second program being started after the first program is finished.

11. A non-transitory computer readable medium including programmed instructions for analyzing an order relation among a plurality of programs executed in parallel by a plurality of processors, respectively, wherein the instructions, when executed by a computer, cause the computer to perform:
 collecting assigned destination processor information specifying a processor assigned with an execution of a program among the plurality of programs, and synchronization information specifying an order of a synchronization process and the program, generated while executing the program;

determining an element corresponding to the processor specified by the assigned destination processor information among a plurality of elements included in a data format, as an element associated with the program, each of the elements indicating an ordinal value of the program, a number of the elements included in the data format being N×P, wherein N is an integer greater than or equal to one and P is a total number of the plurality of processors; and calculating an ordinal value indicated by the element associated with the program, for each segment more than one that the program is divided into, based on the synchronization information, when the synchronization process occurs while executing the program, wherein in the step of calculating the ordinal value, the ordinal value indicated by the element is calculated so that a first segment of a second program is a segment that succeeds a last segment of a first program, when an element associated with the first program and an element associated with the second program are identical, the second program being started after the first program is finished.

* * * * *